United States Patent [19]

Schumacher

[11] 4,430,468

[45] Feb. 7, 1984

[54] SURFACTANT-CONTAINING FILLED AND PLASTICIZED THERMOPLASTIC COMPOSITIONS BASED ON ETHYLENE INTERPOLYMERS

[75] Inventor: Frederick G. Schumacher, Wilmington, Del.

[73] Assignee: E. I. Du Pont de Nemours and Company, Wilmington, Del.

[21] Appl. No.: 400,243

[22] Filed: Jul. 21, 1982

[51] Int. Cl.$^3$ .................. B32B 27/30; C08K 5/01; C08L 23/26; C08L 93/00

[52] U.S. Cl. ...................... 524/109; 428/95; 524/13; 524/15; 524/115; 524/145; 524/167; 524/423; 524/425; 524/427; 524/435; 524/437; 524/445; 524/449; 524/451; 524/515; 524/522; 524/523; 524/524; 524/543; 524/556; 524/560; 524/561; 524/563; 524/564

[58] Field of Search .............. 524/915, 270, 271, 272, 524/522, 523, 515, 109, 13, 524, 543; 106/308 S, 308 Q; 428/95

[56] References Cited

U.S. PATENT DOCUMENTS

| | | | |
|---|---|---|---|
| 3,067,053 | 12/1962 | Tarantino | 106/308 S |
| 4,064,081 | 12/1977 | McCoy et al. | 524/915 |
| 4,187,192 | 2/1980 | Sheridan | 106/308 S |
| 4,191,798 | 3/1980 | Schumacher et al. | 524/418 |
| 4,192,788 | 3/1980 | Dodson | 524/915 |
| 4,222,924 | 9/1980 | Schumacher | 524/445 |
| 4,263,196 | 4/1981 | Schumacher et al. | 524/423 |
| 4,270,955 | 6/1981 | Eshelman | 106/308 Q |
| 4,335,034 | 6/1982 | Zuckerman et al. | 524/915 |
| 4,338,227 | 7/1982 | Ballard | 524/522 |

FOREIGN PATENT DOCUMENTS

| | | | |
|---|---|---|---|
| 56-118432 | 2/1980 | Japan | 524/515 |
| 917947 | 2/1963 | United Kingdom | 106/308 S |

*Primary Examiner*—Ronald W. Griffin

[57] ABSTRACT

Filled thermoplastic compositions having enhanced elongation and useful, e.g., as sound-deadening sheeting for automotive carpet, are obtained by blending about 0–50% by weight of an ethylene interpolymer, such as ethylene/vinyl ester, ethylene/unsaturated mono- or dicarboxylic acids or esters of said unsaturated acids, etc.; 0–20% by weight of a plasticizer selected from the group consisting of processing oils, epoxidized oils, polyesters, polyethers, polyether esters and combinations thereof; about 40–90% by weight of filler; from about 0.05 to about 5.0% by weight of at least one surface active agent such as sulfonates, sulfates, phosphates, etc.; and optionally, modifying resins, such as tackifiers and certain ethylene and propylene homo- and copolymers.

18 Claims, No Drawings

SURFACTANT-CONTAINING FILLED AND PLASTICIZED THERMOPLASTIC COMPOSITIONS BASED ON ETHYLENE INTERPOLYMERS

BACKGROUND OF THE INVENTION

1. Field of the Invention

This invention relates to filled and plasticized blends of ethylene interpolymers and more specifically it relates to such blends modified with surface active agents.

2. Description of the Prior Art

Japanese Patent Publication No. 23128-1980 describes filled ethylene copolymer compositions (in particular, ethylene/ethyl acrylate; 5 to 30% ethyl acrylate) with 100 to 500 parts by weight of a inorganic filler which has been surface-treated with a titanate-based coupling agent (e.g. isopropyl triisostearyl titanate). The compositions which result are claimed to provide noticeably improved tensile strength, elongation at break, stretchability, and heat shrinkage, vs. compositions which do not employ titanate-based coupling agents.

Japanese Patent Publication No. 21052-1980 describes a filled polymer composition which uses as raw materials a polymer mixture of (a) ethylene/vinyl acetate (EVA) copolymer, which contains from 10 to 28% vinyl acetate; (b) rubber, preferably chloroprene rubber of ethylene-propylene rubber, and (c) filler. The ratio of EVA:rubber is from 60:40 to 90:10. The mixture should contain 100 parts of polymer mixture and 150 parts of a high specific gravity filler. It may optionally contain other ingredients, such as dibutyl phthalate as a plasticizer, and stearic acid. It is intended for use in vacuum-molded sheet or in injection molded form for sound-deadening purposes.

U.K. patent application No. 2,067,576A describes a composition which contains three essential ingredients—10 to 25% of a thermoplastic resin component (such as ethylene/ethyl acrylate or ethylene/vinyl acetate copolymers), 4 to 15% of an olefinic elastomer (such as ethylene/propylene rubber; ethylene/propylene/diene rubber, or polyisobutylene/isoprene copolymer), and from 60 to 85% of a filler component, such as barium sulfate or calcium carbonate. Optional additional ingredients include 0.25 to 2.0% of stearic acid and stearates which allegedly function as a processing aid; 2 to 10% of paraffinic or naphthenic hydrocarbon oil; tackifying resins; titanates or polymeric ester surface-treating aids, etc. Carpet constructions employing the above compositions are also disclosed. The compositions described in this application are alleged to offer unusually high flexibility as compared with blends known heretofore.

SUMMARY OF THE INVENTION

According to the present invention there is provided a composition comprising (a) from 0 to about 50% by weight of at least one copolymer of ethylene with at least one comonomer selected from the group consisting of vinyl esters of saturated carboxylic acids wherein the acid moiety has up to 4 carbon atoms, unsaturated mono- and dicarboxylic acids of 3 to 5 carbon atoms, salts of said unsaturated acids, and esters of said unsaturated acids wherein the alcohol moiety has 1 to 8 carbon atoms, the ethylene content of said copolymer being from about 40 to about 95% by weight, the comonomer content of said copolymer being from about 5 to about 60% by weight, and the melt index of said copolymer being from about 0.1 to about 400, provided that when said copolymer of ethylene is an ethylene/vinyl ester or ethylene/unsaturated mono- or dicarboxylic acid ester copolymer said copolymer can contain up to about 15 percent by weight of carbon monoxide or sulfur dioxide; provided, that when the olefin polymer of paragraph (e) is absent, the amount of ethylene copolymer is at least about 5% by weight;

(b) from 0 to about 20 percent by weight of at least one plasticizer selected from the group consisting of processing oils, epoxidized oils, polyesters, polyethers, and polyether esters;

(c) from about 40 to about 90% by weight of filler;

(d) from about 0.05 to about 5.0% by weight of at least one surface active agent selected from the group consisting of alkanol amides; betaine derivatives; block copolymers comprising a series of condensates of ethylene oxide with hydrophobic bases formed by condensing propylene oxide with propylene glycol; ethoxylated compounds comprising alcohols, alkyl phenols, amines and amides; sulfonated derivatives comprising alkyl sulfonates, aryl sulfonates, alkyl-aryl sulfonates, amine and amide sulfonates, olefin sulfonates, sulfosuccinates, sulfonated fatty acid esters, sulfonates of ethoxylated alkyl phenols and of oils and of fatty acids, naphtholene and alkyl naphtholene sulfonates, condensed naphtholene sulfonates, naphthalene and alkyl naphthalene sulfonates and petroleum sulfonates, and dodecyl and tridecyl benzene sulfonates; dodecyl and tridecyl sulfonic acids; sulfates of alcohols, of ethoxylated alcohols, of ethoxylated alkyl phenols, of oils, of fatty acids, of fatty esters, alkaryl sulfates, and sodium, ammonium and amine salts thereof; phosphate derivatives comprising phosphate esters, phosphate alcohol ethoxylates, phosphate ether ethoxylates, phosphate alkyl acids and phosphate alkyl quaternaries; and quaternary surfactants;

(e) from 0 to about 55% by weight of olefin polymer selected from the group consisting of low density branched polyethylene, high density linear polyethylene, linear copolymers of ethylene and another olefin comonomer, polypropylene and copolymers of propylene and ethylene where the ethylene content is up to 20% by weight provided, that when the ethylene copolymer of paragraph (a) is absent the amount of olefin polymer is at least about 5% by weight; and (f) from 0 to about 50% by weight of elastomeric polymer; and (g) from 0 to about 30% by weight of tackifier.

Further provided according to the present invention are the above compositions in the form of a sound-deadening sheet.

Still further provided according to the present invention are carpets and especially automotive carpets and foam fabric or scrim having a backside coating consisting essentially of the above composition.

DETAILED DESCRIPTION OF THE INVENTION

The inclusion of a processing oil in highly loaded blends of ethylene-vinyl acetate (EVA) and filler has been described in U.S. Pat. No. 4,191,798. When the filler loading exceeded about 70%, the tensile elongation of the blend tended to drop sharply—to the undesirably low range of 15-30%. It has been found that inclusion of very small amounts of a surface active agent (surfactant) of the proper type will produce a remarkably and unexpectedly large increase in the tensile elongation value of the individual blend.

The ethylene copolymers suitable for the composition of the present invention are copolymers with at least one comonomer selected from the group consisting of vinyl esters of saturated carboxylic acids wherein the acid moiety has up to 4 carbon atoms, unsaturated mono- or dicarboxylic acids of 3 to 5 carbon atoms, salts of said unsaturated acids and esters of said unsaturated mono- or dicarboxylic acids wherein the alcohol moiety has 1 to 8 carbon atoms. Terpolymers of ethylene and the above comonomers are also suitable. In addition, terpolymers of ethylene/vinyl acetate/carbon monoxide or ethylene/vinyl acetate/sulfur dioxide containing up to about 15 percent by weight of carbon monoxide or sulfur dioxide can also be employed.

The ethylene content of the copolymer is from about 40 to about 95% by weight, and the comonomer content is from about 5 to about 60% by weight. The preferred ethylene and comonomer level is from about 45 to about 91% and from about 9 to about 55% by weight, respectively. The most preferred ethylene and comonomer content is from about 88 to about 72% and from about 12 to about 28%, respectively. A mixture of two or more ethylene copolymers can be used in the blends of the present invention in place of a single copolymer as long as the average values for the comonomer content will be within the above indicated range.

Employing a copolymer containing over 28% nonethylenic comonomer (such as vinyl acetate) results in blends that are less stiff and have lower tensile strength, while their elongation is increased. The most preferred level is about 12 to 28 weight percent. Below 12% vinyl acetate, the blends become much stiffer, lose elongation, and oil compatability problems may arise. Even blends made with nonbleeding oils tend to become "oily" as polyethylene homopolymer is approached.

Melt index of the copolymer can range from about 0.1 to about 400, preferably from about 0.1 to about 50. Physical properties, principally elongation, decline to lower levels when the ethylene copolymer melt index is above about 50. Lower melt index ranges, from about 1 to about 10, are most preferred to maintain strength.

Generally from about 5 to about 50% by weight of ethylene copolymer is employed in the composition of the present invention, preferably from about 8 to about 35% by weight, and most preferably from about 12 to about 25% by weight.

Particularly useful properties can be obtained when two properly-selected ethylene copolymers are used in blends of the present invention. By combining at least two different properly selected EVA copolymer grades, copolymers (A) and (B), with filler, plasticizer, and an effective surfactant, unexpected and unusual modification of the physical properties of the filled composition can be achieved as compared with compositions containing only a single EVA resin grade. Most significantly, by replacing a single EVA grade in a filled blend with an equal amount of a properly selected mixture of two EVA grades, where the mixture has the same weight percent vinyl acetate content and melt index as the single EVA grade replaced, the tensile elongation can be increased substantially.

The polar comonomer (such as vinyl acetate) content of the first copolymer, copolymer (A), is from about 2 to about 30 percent by weight. The polar comonomer content of the second copolymer, copolymer (B), is from about 28 to about 60 percent by weight, provided that the polar comonomer content of the second copolymer is at least 12 weight percent greater than the polar comonomer content of the first copolymer. The balance of copolymers (A) and (B) is made up by ethylene.

The polar comonomer content of the first copolymer is preferably from about 5 to about 28 percent by weight, and the polar comonomer content of the second copolymer is preferably from about 30 to about 60 percent by weight, provided that the polar comonomer content of the second copolymer is at least 15 weight percent greater than the polar comonomer content of the first copolymer.

The most preferred polar comonomer content of the first copolymer is from about 10 to about 25 percent by weight, and most preferred polar comonomer content of the second copolymer is from about 33 to about 60 percent by weight, provided that the polar comonomer content of the second copolymer is at least 18 percent greater than the polar comonomer content of the first copolymer.

The weight ratio of the first copolymer to the second copolymer in the compositions of the present invention can range from about 99/1 to about 55/45, preferably from about 97/3 to about 60/40, and most preferably from about 95/5 to about 65/35.

The melt index of the first copolymer can range from about 0.1 to about 20, preferably from about 0.3 to about 10, and most preferably from about 0.5 to about 2. The melt index of the second copolymer can range from about 5 to about 1000, preferably from about 10 to about 200, and most preferably from about 15 to about 100.

Generally, from about 5 to about 50 percent by weight of the mixture of the first copolymer and the second copolymer is employed in the composition of the present invention. Preferably from about 8 to about 35 percent by weight, and most preferably from about 12 to about 25 percent by weight is employed.

In accordance with the above, suitable ethylene copolymers are such as ethylene/vinyl acetate, ethylene/acrylic acid and its ionomers, ethylene/methacrylic acid and its ionomers, ethylene/methyl acrylate, ethylene/ethyl acrylate, ethylene/isobutyl acrylate, ethylene/normal butyl acrylate, ethylene/isobutyl acrylate/methacrylic acid and its ionomers, ethylene/normal butyl acrylate/methacrylic acid and its ionomers, ethylene/isobutyl acrylate/acrylic acid and its ionomers, ethylene/normal butyl acrylate/acrylic acid and its ionomers, ethylene/methyl methacrylate, ethylene/vinyl acetate/methacrylic acid and its ionomers, ethylene/vinyl acetate/acrylic acid and its ionomers, ethylene/vinyl acetate/carbon monoxide, ethylene/methyl acrylate/carbon monoxide, ethylene/normal butyl acrylate/carbon monoxide, ethylene/isobutyl acrylate/carbon monoxide, ethylene/vinyl acetate/monoethyl maleate and ethylene/methyl acrylate/monoethyl maleate.

Particularly suitable copolymers are ethylene/vinyl acetate, ethylene/ethyl acrylate, ethylene/methyl acrylate, ethylene/isobutyl acrylate, ethylene/methyl methacrylate, and ethylene/vinyl acetate/methacrylic acid.

The first group of plasticizer ingredient of the composition of the present invention is known as process or processing oil. Three types of processing oils are known—paraffinic, aromatic and naphthenic. None of these are pure; the grades identify the major oil type present.

Paraffinic oils tend to "bleed" from blends. Bleeding is normally not desirable, but could be useful in specialty applications, for example, in concrete forms where mold release characteristics are valued.

On the other hand, naphthenic and aromatic oils are nonbleeding when used in proper ratios and are thus preferable for uses such as automotive carpet backsize.

Processing oils are also subdivided by viscosity range. "Thin" oils can be as low as 100–500 SUS (Saybolt Universal Seconds) at 100° F. (38° C.). "Heavy" oils can be as high as 6000 SUS at 100° F. (38° C.). Processing oils, especially naphthenic and aromatic oils with viscosity of from about 100 to 6000 SUS at 100° F. (38° C.) are preferred.

The amount of plasticizer, such as the process oil, present in the composition of the present invention is from 0 to about 20% by weight, preferably from about 2 to about 15% by weight. Most preferably when using a filler of medium density, such as calcium carbonate, the amount of processing oil is from about 4 to about 10% by weight, and when using a filler of higher density, such as barium sulfate, the amount of processing oil is from about 3 to about 10% by weight.

In many cases, addition of processing oil in an amount of less than about 2% will not have a significant effect. Processing oil in excess of about 10% will cause the melt index to rise rapidly and the blend to become much softer. At extremes, for example, at 70% filler, over 15% oil and less than 15% EVA, the oil content overwhelms the blend as the amount of EVA present is not adequate to provide adequate strength for the blend.

In the selection of a process oil, other factors such as the type of oil selected and its viscosity must be considered. These are discussed in detail in U.S. Pat. No. 4,191,798, which is incorporated by reference.

The second group of plasticizers that are effective in the practice of the present invention is the group comprising epoxidized oils such as epoxidized soybean oil and epoxidized linseed oil.

The third group of plasticizers that are effective are the polyesters, which, in general, are liquid condensation products of a polybasic acid and a polyol. The term "liquid" in the context of the present invention is used to mean pourable at room temperature. The acid component is most often a saturated aliphatic dibasic acid or an aromatic dibasic acid; adipic acid, azelaic acid, phthalic acid, sebacic acid, and glutaric acid, or mixtures thereof. The polyol can be an aliphatic polyol or a polyoxyalkylene polyol, such as ethylene glycol, propylene glycol, 1,4- and 1,3-butane glycol, diethylene glycol, and polyethylene glycol. Preferred polyester compositions would consist of an acid component of which greater than 50% by weight are aliphatic dibasic acids, and a polyol component of aliphatic polyol or even more preferably aliphatic glycol. Most preferred compositions are based on adipic or azelaic acid, and propylene glycol or 1,3- or 1,4-butane glycol. The molecular weight of these plasticizers can vary from a low of a few hundred up to a high of about 10,000. The molecular weight of commercial products is seldom specified. Typically in the trade, the molecular weight range of the product is classified as low, medium, or high. The preferred range for purposes of this invention is that classified as medium.

Mixtures of polyesters with hydrocarbon oils are also effective plasticizers in the present invention. One objective of using such a mixture is to couple the high efficiency of the relatively high cost polyester with the low cost of the hydrocarbon oil. The cost/performance of a compound plasticized with such a mixture can be improved significantly for a given application because properties can be tailored more precisely, or filler levels can be increased. Actually certain advantages in the performance of the blends of the present invention are obtained as will be discussed below, when such a mixture is used as the plasticizer.

When used alone, the amount of polyester plasticizer in the composition of the present invention is from about 1 to about 15% by weight, preferably from about 2 to about 12% by weight.

Where a mixture of the polyester plasticizer and a hydrocarbon oil is employed, the relative proportions of the two components can be varied over a wide range depending upon performance objectives. Mixtures containing 50% or less of the polyester are preferred for economic reasons, and most preferred are those containing 20% or less of the polyester.

A separate class of plasticizers, polyethers and polyether esters, are also effective plasticizers in blends of the ethylene copolymers and fillers described above. In general, polyethers are oligomers or polymers of alkylene oxides; polymers of ethylene or propylene oxide are the most common types available commercially. Polyethers can be prepared by polymerization of aldehydes using various types of catalysts, or by acid or base catalyzed polymerization of an alkylene oxide, for example. Polyethers can be terminated by hydroxyl groups to form the diol (glycol) or, in the case of adducts of alkylene oxides with glycerol, for example, the triol, and so forth. The hydroxyl terminated polyether can also be reacted with an acid to form the ester. Fatty acids such as lauric and stearic acids are commonly used; the most common examples of these compounds are the mono- and diesters of polyethylene or polypropylene glycol. The molecular weight of polyethers may range up to those typical of high polymers.

Preferred polyether compositions in the practice of this invention are those consisting of the polyols based on random and/or block copolymers of ethylene oxides and propylene oxides. The copolymer polyols provide better performance in terms of efficiency in compounds of the present invention containing very high levels of filler.

When used alone the amount of polyether plasticizer in the composition of the present invention is from about 1 to about 15% by weight, preferably from about 2 to about 12% by weight.

Mixtures of the polyether or the polyether ester plasticizers with either a polyester plasticizer or a hydrocarbon processing oil can also be used in the practice of this invention. The advantage of polyether/polyester combination is the lower cost since the polyethers are cheaper than the polyesters. Combinations of polyether and processing oil are also cheaper because of the lower cost of the oil.

The relative proportions of the two components in a polyether/polyester combination will be adjusted according to the efficiency of the system based on property requirements and cost. Those based primarily on polyester will not be as stiff and will be more expensive, for example, than those based primarily on a polyether or polyether ester.

Where a mixture of the polyether or polyether ester and a hydrocarbon oil is employed, the relative proportions used will again depend upon cost and property requirements. Since the polyethers are more expensive than the processing oils, mixtures containing 50% or less of the polyethers are preferred.

As referred to above a mixture of processing oil, on the one hand, and epoxidized oil, polyester or polyether or polyether ester, or any combination thereof, on the other hand, can also be used very effectively as the plasticizer for the compositions of the present invention. In fact, such a two- or more component plasticizer system, comprising from about 50 to about 95 percent by weight of processing oil, gives higher tensile elongation than can be obtained using either plasticizer alone at the same level. Maximum elongation is achieved using a mixture of processing oil and polyester or polyether or polyether ester or any combination thereof comprising from about 50 to about 80 percent by weight of processing oil.

Where a mixture of plasticizers is used, the amount of plasticizer may range from about 2 to about 15% by weight, preferably from about 4 to about 12% by weight. Most preferably when using a filler of medium density, such as calcium carbonate, the amount of plasticizer is from about 5 to about 10% by weight, and when using a filler of higher density, such as barium sulfate, the amount of plasticizer is from about 4 to about 8% by weight.

The third essential ingredient of the composition of the present invention is the filler. The percentage of filler that can be included in the composition of the present invention on a weight basis is primarily a function of the density of the filler. Particle size and shape of the filler also will have an effect on properties of blends. Fine particle size fillers generally have a tendency to result in higher blend viscosities and they are also more expensive. No. 9 Whiting which has been used extensively in the present compositions (about 95% through 325 mesh) represents a viable midpoint in coarseness, availability, and cost. Most preferred fillers are calcium carbonate and barium sulfate. The amount of filler present in the composition of the present invention is from about 40 to about 90% by weight, preferably from about 55 to about 90% by weight. Most preferably, when using a filler of medium density, such as calcium carbonate, the amount of filler is from about 65 to about 85% by weight, and when using a filler of higher density, such as barium sulfate, the amount of filler is from about 70 to about 90% by weight.

When the ethylene interpolymer employed in the composition of the present invention is an ethylene/vinyl ester copolymer, such as ethylene/vinyl acetate, and when the filler employed in combination therewith is clay, such as "SUPREX" Clay, it is necessary to add oil to the blend in order to passivate the clay. Proper sequencing of the addition of the ingredients is necessary to attain success in the mixing operation. Sequence A, below, during intensive mixing will be successful; while Sequence B may fail, if the EVA/clay mixture is heated before the clay is passivated, because of the decomposition of the EVA copolymer caused by the clay. Decomposition is accompanied by liberation of anhydrous acetic acid and discoloration of the blend.

Sequence A: "X"-Clay-"Y"-OIL-Mix-EVA-Mix.
Sequence B: "X"-Clay-EVA-Mix-Oil-"Y"-Mix.

In the above illustration, "X" and "Y" may be either nothing or other fillers, diluents or resins that do not influence the otherwise probable adverse reaction of the EVA with untreated clay. The above passivation of clay, in order to enable use of substantial amounts of clay in ethylene/vinyl ester blends, is the subject matter of U.S. Pat. No. 4,222,924. Further details on the effect of particle size of the filler on blend properties is given in U.S. Pat. No. 4,263,196.

In addition to the fillers mentioned above, incorporation of many other types is, of course, possible without altering the fundamentals taught in this patent. For example, inclusion of alumina trihydrate (hydrated alumina—$Al_2O_3.3H_2O$) is highly desirable when flame-retardant or low-smoke-tendency blends are desired. Heavy fillers, such as powdered iron or lead, or oxides of them, can be employed when ultra-dense blends are desired. Similarly, minerals having low density, such as magnesium carbonate, calcium sulfate, silica, flyash, and cement dust, or organic fillers such as yarns, wood flour, nut shells, rice hulls etc., can be employed when light-density blends are preferable. Finally, fillers with varied aspect ratios, such as talc, mica, from highly acicular (wollastonite, etc.) to round (glass beads, etc.) can also be employed to alter tensile strength/elongation relationships.

The final essential ingredient for the subject blend is a surface active agent of the proper type. For purposes of this invention, a surfactant is defined as "any compound which reduces the interfacial tension between a liquid and a solid." *Condensed Chemical Dictionary*, Tenth Edition, Van Nostrand Reinhold Company, page 986). Further, the key characteristic property for liquids is surface tension, and that of a solid surface is adsorption. Both have the same cause, namely, the inward cohesive forces acting on the molecules at the surface (ibid., p. 564, "interface"). In the descriptions which follow, the terms "surfactant" and "surface active agent" will be used interchangeably.

Literally thousands of surfactants exist. To classify and to distinguish by category those surface active agents which are suitable for the purposes of this invention, the system utilized in a standard reference source—McCutcheon's "Emulsifiers and Detergents"-"North American Edition-1981" has been selected.

Surfactants which are effective in attaining the purposes of this invention are those which are selected from the group consisting of alkanol amides; betaine derivatives; block copolymers comprising a series of condensates of ethylene oxide with hydrophobic bases formed by condensing propylene oxide with propylene glycol; ethoxylated compounds comprising alcohols, alkyl phenols, amines and amides; sulfonated derivatives comprising alkyl sulfonates, aryl sulfonates, alkylaryl sulfonates, amine and amide sulfonates, olefin sulfonates, sulfosuccinates, sulfonated fatty acid esters, sulfonates of ethoxylated alkyl phenols and of oils and of fatty acids, naphtholene and alkyl naphtholene sulfonates, condensed naphtholene sulfonates, naphthalene and alkyl naphthalene sulfonates and petroleum sulfonates, and dodecyl and tridecyl benzene sulfonates; dodecyl and tridecyl sulfonic acids; sulfates of alcohols, of ethoxylated alcohols, of ethoxylated alkyl phenols, of oils, of fatty acids, of fatty esters, alkaryl sulfates, and sodium, ammonium and amine salts thereof; phosphate derivatives comprising phosphate esters, phosphate alcohol ethoxylates, phosphate ether ethoxylates, phosphate alkyl acids and phosphate alkyl quaternaries; and quaternary surfactants.

The number of surfactants in existence is enormous; the examples named above can be replaced by other close analogs with good results and without departing from the spirit of this invention.

The preferred surface active agents are selected from the group consisting of alkanol amides; betaine derivatives; block copolymers consisting essentially of a series of condensates of ethylene oxide with hydrophobic bases formed by condensing propylene oxide with propylene glycol; ethoxylated compounds consisting essentially of ethoxylated alcohols, alkyl phenols, amines and amides; sulfonated derivatives consisting essentially of alkyl sulfonates, alkyl-aryl sulfonates, amine and amide sulfonates, sulfonated fatty acid esters, sulfonates of ethoxylated alkyl phenols and of oils and of fatty acids, naphtholene and alkyl naphtholene sulfonates, and condensed naphtholene sulfonates and dodecyl and tridecyl benzene sulfonates; sulfates of alcohols, of ethoxylated alcohols, of fatty acids, alkaryl sulfates, and sodium, ammonium and amine salts thereof; phosphate derivatives consisting essentially of phosphate esters, phosphate alcohol ethoxylates, phosphate ether ethoxylates, phosphate alkyl acids and phosphate alkyl quaternaries; and quaternary surfactants.

The most preferred surfactants are selected from the group consisting of sulfonated derivatives consisting essentially of alkyl sulfonates, alkyl-aryl sulfonates, amine and amide sulfonates, sulfonated fatty acid esters, sulfonates of ethoxylated alkyl phenyls and of oils and of fatty acids, naphtholene and alkyl naphtholene sulfonates, and condensed naphtholene sulfonates; sulfates of alcohols, of ethoxylated alcohols, of fatty acids, alkaryl sulfates, and sodium, ammonium and amine salts thereof; and phosphate esters.

In using surface active agents of the types described in the compositions of this invention the amount is from about 0.05% to about 5% by weight, and preferably from about 0.1% to about 2.5%. Most preferably, when using a surfactant which is particularly effective, the amount is from about 0.12% to about 0.75%.

In many cases, for the user's convenience, the surfactant may be offered as a solution or dispersion in water or in an organic solvent. In such cases, the percentages in the preceding paragraph refer to the amount of active ingredient present—and not to the product as supplied.

Polymers, both homo- and copolymers, other than the ones referred to above, can also be used to some extent in combination with the above specified polymers without significantly interfering with the advantages obtained by the present invention. These include, but without limitation, polymers such as ethylene/carbon monoxide and ethylene/sulfur dioxide. Similarly, other ingredients can also be added to the compositions of the present invention by a compounder in order to obtain some desired effect, such as reduction of cost, or enhancement of a physical property. Accordingly, extender resins, waxes, foaming agents, crosslinking agents, antioxidants, etc. that are widely used, particularly the present invention. Illustrative examples of several special additives and of potentially desirable resin ingredients are given below.

Elastomeric polymers are of interest as modifying resins for the blends of the present invention. They exhibit good compatibility in the blends and can be useful for modifying flexibility or other physical properties. The blends of the present invention can contain from 0 to about 50% by weight of an elastomer or a mixture of elastomers, preferably from 0 to about 25% by weight, and most preferably from 0 to about 12% by weight. Mooney viscosity of the elastomers is preferably in the range of from 20 to 90. Thermoplastic elastomers (e.g., ethylene-propylene rubber, styrene-butadiene-styrene, polyurethane, etc.) or vulcanizable elastomers (e.g., styrene-butadiene rubber, ethylene/propylene/diene terpolymer (EPDM), chlorosulfonated polyethylene, etc.) can be used. Preferred elastomers are ethylene-propylene rubber and EPDM rubber in which the ethylene content should range from above 20 percent by weight to about 80 percent by weight. The diene comonomer (in EPDM) is usually methylene norbornene, ethylidene norbornene, dicyclopentadiene or 1,4-hexadiene, although other dienes may be used, and the concentration of the diene is usually less than about 5 percent by weight. When vulcanizable elastomers are used, they are added in the nonvulcanized state; if desired, the resulting compound can be cured in a subsequent operation to produce a product with increased tensile strength and improved high temperature performance.

The basic blends described above are essentially free of surface tack at ambient temperature. Even if made with a "bleeding" type of paraffinic oil, the final sheet, at ambient temperature, may be slippery to the touch but will not be tacky. (Of course, as temperatures are increased to the 200° F.-250° F. level, the blends will be progressively softened and will adhere well to many substrates.) From time to time, compounders probably will want to produce sheeting with enhanced surface tack or adhesiveness. This can be done in the blends described in the present invention by incorporating a tackifier resin in the formulation. The tackifier may be any suitable tackifier known generally in the art such as those listed in U.S. Pat. No. 3,484,405. Such tackifiers include a variety of natural and synthetic resins and rosin materials. The resins which can be employed are liquid, semi-solid to solid, complex amorphous materials generally in the form of mixtures of organic compounds having no definite melting point and no tendency to crystallize. Such resins are insoluble in water and can be of vegetable or animal origin, or can be synthetic resins. The resins employed function to provide substantial and improved tackiness of the composition. Suitable tackifiers include, but are not necessarily limited to the resins discussed below.

A class of resin components which can be employed as the tackifier composition hereof, are the coumarone-indene resins, such as the para coumarone-indene resins. Generally the coumarone-indene resins which can be employed have a molecular weight which ranges from about 500 to about 5,000. Examples of resins of this type which are available commercially include those materials marketed as "Picco"-25 and "Picco"-100.

Another class of resins which can be employed as the tackifier hereof are the terpene resins, including also styrenated terpenes. These terpene resins can have a molecular weight range from about 600 to 6,000. Typical commercially available resins of this type are marketed as "Piccolyte" S-100, as "Staybelite Ester" #10, which is a glycerol ester of hydrogenated rosin, and as "Wingtack" 95 which is a polyterpene resin.

A third class of resins which can be employed as the tackifier are the butadiene-styrene resins having a molecular weight ranging from about 500 to about 5,000. A typical commercial product of this type is marketed as "Buton" 100, a liquid butadiene-styrene copolymer resin having a molecular weight of about 2,500. A fourth class of resins which can be employed as the tackifier hereof are the polybutadiene resins having a molecular weight ranging from about 500 to about 5,000. A commercially available product of this type is that marketed as "Buton" 150, a liquid polybutadiene resin having a molecular weight of about 2,000 to about 2,500.

A fifth class of resins which can be employed as the tackifier are the so-called hydrocarbon resins produced by catalytic polymerization of selected fractions obtained in the refining of petroleum, and having a molecular weight range of about 500 to about 5,000. Examples of such resin are those marketed as "Piccopale"-100, and as "Amoco" and "Velsicol" resins. Similarly polybutenes obtained from the polymerization of isobutylene may be included as a tackifier.

The tackifier may also include rosin materials, low molecular weight styrene hard resins such as the material marketed as "Piccolastic" A-75, disproportionated pentaerythritol esters, and copolymers of aromatic and aliphatic monomer systems of the type marketed as "Velsicol" WX-1232. The rosin which may be employed in the present invention may be gum, wood or tall oil rosin but preferably is tall oil rosin. Also the rosin material may be a modified rosin such as dimerized rosin, hydrogenated rosin, disproportionated rosin, or esters of rosin. Esters can be prepared by esterifying the rosin with polyhydric alcohols containing 2–6 alcohol groups.

A number of examples of suitable tackifiers is given in Table 9, below. These must be regarded only as typical examples, as literally hundreds of logical candidates exist. A more comprehensive listing of tackifiers which can be employed is provided in the TAPPI CA Report #55, February 1975, pages 13–20, inclusive, a publication of the Technical Association of the Pulp and Paper Industry, Atlanta, Ga., which lists well over 200 commercially available tackifier resins.

In use, the compounder generally will want to select an ethylene-based copolymer and a tackifier resin which will be mutually compatible; chemical similarities which will indicate compatibility can be used for guidance. For a few highly specialized uses, such as super-hot-tack, quick-stick blends, the compounder may well elect to use incompatible systems. Finally, the reverse effect may be sought—in such instances, where an unusually slippery surface is desired, incorporation of small amounts of a slip aid such as Armid O may prove beneficial.

In using tackifier resins, the amount used in compositions of this invention is from 0 to about 30% by weight of the blend; preferably from 0 to about 20% by weight; and, most preferably, from 0 to about 15% by weight.

The surface active additives described in this specification are particularly helpful when one of the many commercially available polyethylenes is employed as a substitute for part or all of the ethylene copolymer of the blend. As polyethylenes (whether LDPE, LLDPE, or HDPE) do not "wet" fillers effectively, it is not practical to incorporate more than perhaps 10 to 20% filler into binary blends of PE and filler. However, as shown in Table 5, useful blends in which the polyethylene is the only resinous ingredient can be prepared by employing both a process oil and a surfactant additive. Thus, the substitution of homopolymer for copolymer can cover the entire range from 0 to 100%. In practice, intermediate PE levels would be used in most commercial blends to attain a desired stiffness level, concomitant with other needed properties. The "ideal" level will, of necessity, vary according to the physical property desired.

The teachings above have dealt with several different potential polymeric ingredients on an "individual-ingredient" basis to outline contributions possible from widely varying resin or polymer types. It must be stressed that polymer ingredients of the above types can, of course, be mixed so that, for example, the compounder may elect to modify a simple four-component EVA/oil/filler/surfactant composition by replacing part of the EVA with a small amount of rubber as a polymeric softener, or of tackifier for adhesivity. In addition part of the oil can be replaced with a polyester or polyether-type additive to attain highly effective plasticization with a lower total amount of plasticizer. Thus, the possible combinations and permutations available to a skilled compounder will be infinite, yet remain within the spirit and intent of this invention.

The blends of the present invention are thermoplastic in nature and therefore can be recycled after processing. The recycled material may also contain textile fibers, jute, etc. present in the trim obtained during production of the finished product (e.g., back-coated automotive carpet).

A commercially sized batch-type Banbury or equivalent intensive mixer is entirely suitable for preparing the compositions of the present invention. A Farrel continuous mixer ("FCM") is also an excellent mixing device. In either instance, dry ingredients are charged in routine fashion. It is convenient in most cases to inject the plasticizer component directly into the mixing chamber of either unit as per widely used practice with this type of equipment. When more than one plasticizer is used, and where any one of the plasticizers is present in a small amount (less than about 10 weight percent of the total plasticizer mixture), the plasticizers should be pre-blended before addition to the other ingredients of the present invention. This will facilitate uniform distribution of each plasticizer component in the final composition and thus ensure that optimum properties are obtained. Similarly, since the amounts of surfactant employed generally is so small, less than 1% for many cases, it is important to be certain that the surfactant is thoroughly mixed into the final blend. If this is not done, highly erratic values for physical properties may result. Thus, it may often prove helpful to premix the surfactant into a portion of one of the other ingredients, e.g., a liquid surfactant may be premixed with the process oil or a solid surfactant may be premixed with an aliquot of the filler. If desired, the copolymer and the plasticizer(s) can be precompounded as a "Masterbatch" in a suitable intensive mixing device (e.g., Banbury mixer or screw extruder). This "Masterbatch" can then be compounded with the filler and the other remaining ingredients to produce the final composition. A mix cycle of about 3 minutes is generally adequate for the Banbury mixer at an operating temperature usually between 325° and 375° F. The operating rate for the FCM unit generally will fall within ranges predicted by literature prepared by the Farrel Company, Ansonia, Conn. Here, temperatures between 325° and 425° F. are effective. In both cases, a very low plasticizer level, say about 2–3%, may require higher temperatures, while plasticizer levels above about 7% may mix well at lower mixer temperatures. While not evaluated, it is expected that other devices for handling viscous mixes (MI of 0.1 to 20) should be entirely satisfactory—but in any case, prototype trials in advance are desirable.

Generally, changes in the sequence of addition of ingredients has not been found to be significant, provided that the final mixture is thoroughly fluxed to attain homogeneity.

Once blends are mixed, routine commercial practices may be used, such as underwater melt cutting plus drying or use of sheeting plus chopping methods, to produce a final pelletized product. Alternately, the hot mixture also may be immediately fabricated into a final form, e.g. sheeting, molding, etc.

Primary use for the compositions of the present invention will probably be in the sheeting field, particularly for low cost, dense, sound deadening structures. Outstanding characteristics such as improved "hand", "drape", reduced stiffness, higher elongation and reduced thickness of the extruded sheeting result from the compositions of the present invention.

Other uses are possible. The principal advantage of the blends of this invention is that certain physical properties, such as flexibility and toughness, which are typically reduced when fillers are added to polymers, can be maintained within useful limits over a broad range of filler concentrations. Thus, blends of this invention could be used in the manufacture of wire and cable compounds, of various molded parts, of sealants and caulks, or in other uses where flexibility and toughness are desired, coupled with the economies normally achieved by the incorporation of low cost fillers.

The blends of the present invention can readily be extruded onto a substrate, such as an automotive carpet, a foam, a fabric or a scrim material, or can be extruded or calendered as unsupported film or sheet. Depending upon the equipment used, and the compounding techniques employed, it is possible to extrude a wide range of film thickness, from below 20 mils to above 100 mils. This then provides industry with an opportunity to vary the amount of sound deadening to be attained by varying film thickness, density of blends, ratio of filler load to binder, and similar techniques well known in the art.

The sound deadening sheet produced may be used in various ways:

When applied to automotive carpet, blends described are an effective and economic means to deaden sound, while also simultaneously serving as a moldable support for the carpet.

When used in sheet form, especially when coated onto a fabric, the blends can be installed in other areas of an automobile, truck, bus, etc., such as side panels, door panels, roofing areas, dash insultators, etc.

In sheet form, blends may be used as drapes or hangings to shield or to surround a noisy piece of factory equipment such as a loom, a forging press, etc.

In laminated sheet form, blends, faced with another material, might be used to achieve both a decorative and a functional use—such as dividing panels in an open-format office.

The application of the compositions of the present invention in carpets, and particularly in automotive carpets, is essentially identical to the methods as already described in U.S. Pat. No. 4,191,798, the disclosure of which is hereby incorporated by reference.

The highly-filled compositions described herein may be processed industrially into final sheet or three-dimensional solid form by using standard fabricating methods well known to those skilled in the art. Thus, fabricating methods such as extrusion, calendering, injection or rotomolding, extrusion coating, sheet laminating, sheet thermoforming, etc. are all practical means for forming the compositions of this invention.

The examples which follow are given for the purpose of illustrating the present invention. All parts and percentages are by weight unless otherwise specified. In all examples, the ingredients were premixed in a one-gallon (about 3.8 l) can by shaking the contents manually for about 0.5 minutes. (Where liquid surface active agents are employed, it is often preferable to premix the very small amount of agent into the much larger volume of liquid plasticizer, separately, before adding the liquid to the one-gallon can, to ensure reaching homogeneity rapidly). The ingredients were then added to a Banbury-type laboratory-sized intensive high-shear mixer. Mix conditions used were fluxing for 3 minutes, at a temperature of about 325° to 375° F. (about 160° to 190° C.).

EXAMPLES 1 TO 23 AND COMPARATIVE EXAMPLE 1

The composition and physical properties of these blends are summarized in Table 1.

Comparative Example 1 shows key properties for a typical highly filled thermoplastic composition based on ethylene/vinyl acetate (EVA) copolymer resins, a process oil, and calcium carbonate resin, as taught in U.S. Pat. No. 4,191,798. The stiffness value is about 75 grams; the Melt Index (MI) is about 2.2, and the elongation is about 25%. The tensile strength is about 650 psi. The indicated MI and stiffness levels are well within practical useful ranges. The tensile strength is far higher than is needed for most industrial uses. However, the elongation is close to the minimum level which is acceptable for commercial sheeting. A lesser value, e.g. less than about 10% elongation, means the sheet will probably tear on handling, unless costly special care is used. Thus, the average user would clearly prefer to sacrifice some degree of tensile strength in order to attain substantially better elongation and tear resistance.

It was found that the addition of a very small amount of selected surfactants produced an astoundingly large change in physical properties for the basic composition. In Examples 1, 3, 8, 9, 10, and 18, only 0.25% of one of the surface active agents tested proved highly effective in enhancing the relatively low elongation value already seen for Comparative Example 1. In all of these instances, the increase in elongation was nearly twentyfold or higher—far higher than might have been predicted. Ten additional surfactants, at the 0.25% level, showed smaller but significant improvements in elongation. For additives 2, 4, 6, 7, 13, 14, 15, 16, 21, and 22, the final elongation values measured from 32% to 52%—equivalent to a 33 to 100% increase in elongation when compared to the 25% level noted for C-1. The balance of the additives tried, at 0.25% addition level, showed smaller or no enhancement in elongation. In several instances, e.g. additives 5, 11, 12, 17, and 20, the lack of effectiveness may reflect the low percentage of active ingredient which the additive contains.

TABLE 1

| EFFECT OF INCLUSION OF SURFACE ACTIVE AGENTS IN BLENDS OF EVA - PROCESS OIL - CaCO₃ | | | | | | |
|---|---|---|---|---|---|---|
| EXAMPLE NO. | C-1 | 1 | 2 | 3 | 4 | 5 |
| EVA #1[(1)] | 16.2 | 16.2 | 16.2 | 16.2 | 16.2 | 16.2 |
| EVA #2[(2)] | 4.0 | 4.0 | 4.0 | 4.0 | 4.0 | 4.0 |

TABLE 1-continued
EFFECT OF INCLUSION OF SURFACE ACTIVE AGENTS IN BLENDS OF EVA - PROCESS OIL - CaCO₃

| | | | | | | |
|---|---|---|---|---|---|---|
| PROCESS OIL - "CIRCOSOL" 4240[3] | 7.3 | 7.3 | 7.3 | 7.3 | 7.3 | 7.3 |
| Filler - No. 9 whiting (15) | 72.5 | 72.5 | 72.5 | 72.5 | 72.5 | 72.5 |
| Additive No. 1[4] | 0.25 | | | | | |
| Additive No. 2[5] | | 0.25 | | | | |
| Additive No. 3[6] | | | 0.25 | | | |
| Additive No. 4[7] | | | | 0.25 | | |
| Additive No. 5[8] | | | | | 0.25 | |
| | | | | | | 0.25 |
| Physical Properties | | | | | | |
| MI[28] | 2.2 | 3.3 | — | 3.4 | — | — |
| SP. GR.[29] | 1.82 | 1.84 | 1.84 | 1.82 | 1.84 | — |
| Tensile Strength[30] | | | | | | |
| PSI | 650 | 390 | 340 | 320 | 380 | 450 |
| kPa | 4480 | 2690 | 2340 | 2200 | 2620 | 3100 |
| Elongation, %[30] | 25 | 430 | 36 | 560 | 32 | 28 |
| Thickness of Strip | | | | | | |
| mils | 62 | 59 | 59 | 59 | 58 | 59 |
| mm | 1.57 | 1.50 | 1.50 | 1.50 | 1.47 | 1.50 |
| Stiffness of strip,[31] g | 75 | 65 | 68 | 59 | 68 | 73 |

| EXAMPLE NO | 6 | 7 | 8 | 9 | 10 | 11 |
|---|---|---|---|---|---|---|
| EVA #1[1] | 16.2 | 16.2 | 16.2 | 16.2 | 16.2 | 16.2 |
| EVA #2[2] | 4.0 | 4.0 | 4.0 | 4.0 | 4.0 | 4.0 |
| PROCESS OIL - "CIRCOSOL" 4240[3] | 7.3 | 7.3 | 7.3 | 7.3 | 7.3 | 7.3 |
| Filler - No. 9 Whiting[15] | 72.5 | 72.5 | 72.5 | 72.5 | 72.5 | 72.5 |
| Additive No. 6[9] | 0.25 | | | | | |
| Additive No. 7[10] | | 0.25 | | | | |
| Additive No. 8[11] | | | 0.25 | | | |
| Additive No. 9[12] | | | | 0.25 | | |
| Additive No. 10[13] | | | | | 0.25 | |
| Additive No. 11[14] | | | | | | 0.25 |
| Physical Properties | | | | | | |
| MI[28] | — | — | 4.3 | 3.8 | 3.7 | — |
| SP. GR.[29] | 1.84 | 1.84 | 1.83 | — | 1.85 | 1.84 |
| Tensile Strength[30] | | | | | | |
| PSI | 290 | 280 | 290 | 400 | 410 | 740 |
| kPa | 2000 | 1930 | 2000 | 2760 | 2830 | 5100 |
| Elongation, %[30] | 52 | 49 | 510 | 550 | 470 | 27 |
| Thickness of Strip, | | | | | | |
| mils | 60 | 59 | 58 | 59 | 60 | 59 |
| mm | 1.52 | 1.50 | 1.47 | 1.50 | 1.52 | 1.50 |
| Stiffness of strip,[31] g | 74 | 68 | 52 | 51 | 58 | 84 |

| EXAMPLE NO | 12 | 13 | 14 | 15 | 16 | 17 |
|---|---|---|---|---|---|---|
| EVA #1[1] | 16.2 | 16.2 | 16.2 | 16.2 | 16.2 | 16.2 |
| EVA #2[2] | 4.0 | 4.0 | 4.0 | 4.0 | 4.0 | 4.0 |
| PROCESS OIL - "CIRCOSOL" 4240[3] | 7.3 | 7.3 | 7.3 | 7.3 | 7.3 | 7.3 |
| Filler - No. 9 Whiting[15] | 72.5 | 72.5 | 72.5 | 72.5 | 72.5 | 72.5 |
| Additive No. 12[16] | 0.25 | | | | | |
| Additive No. 13[17] | | 0.25 | | | | |
| Additive No. 14[18] | | | 0.25 | | | |
| Additive No. 15[19] | | | | 0.25 | | |
| Additive No. 16[20] | | | | | 0.25 | |
| Additive No. 17[21] | | | | | | 0.25 |
| Physical Properties | | | | | | |
| MI[28] | — | — | — | — | — | — |
| SP. GR.[29] | 1.83 | 1.85 | 1.83 | 1.82 | 1.87 | 1.83 |
| Tensile Strength[30] | | | | | | |
| PSI | 740 | 340 | 340 | 330 | 380 | 380 |
| kPa | 5100 | 2340 | 2340 | 2280 | 2620 | 2620 |
| Elongation, %[30] | 27 | 32 | 33 | 33 | 33 | 31 |
| Thickness of Strip, | | | | | | |
| mils | 59 | 59 | 59 | 59 | 59 | 59 |
| mm | 1.50 | 1.50 | 1.50 | 1.50 | 1.50 | 1.50 |
| Stiffness of strip,[31] g | 77 | 65 | 72 | 64 | 69 | 70 |

| EXAMPLE NO | 18 | 19 | 20 | 21 | 22 | 23 |
|---|---|---|---|---|---|---|
| EVA #1[1] | 16.2 | 16.2 | 16.2 | 16.2 | 16.2 | 16.2 |
| EVA #2[2] | 4.0 | 4.0 | 4.0 | 4.0 | 4.0 | 4.0 |
| PROCESS OIL - "CIRCOSOL" 4240[3] | 7.3 | 7.3 | 7.3 | 7.3 | 7.3 | 7.3 |
| Filler - No. 9 Whiting[15] | 72.5 | 72.5 | 72.5 | 72.5 | 72.5 | 72.5 |
| Additive No. 18[22] | 0.25 | | | | | |
| Additive No. 19[23] | | 0.25 | | | | |
| Additive No. 20[24] | | | 0.25 | | | |
| Additive No. 21[25] | | | | 0.25 | | |
| Additive No. 22[26] | | | | | 0.25 | |

TABLE 1-continued
EFFECT OF INCLUSION OF SURFACE ACTIVE AGENTS IN BLENDS OF EVA - PROCESS OIL - CaCO₃

| | | | | | | |
|---|---|---|---|---|---|---|
| Additive No. 23[27] | | | | | | 0.25 |
| Physical Properties | | | | | | |
| MI[28] | — | 3.4 | — | — | — | — |
| SP. GR.[29] | 1.84 | — | — | 1.84 | 1.83 | — |
| Tensile Strength[30] | | | | | | |
| PSI | 310 | 370 | 400 | 340 | 370 | 380 |
| kPa | 2120 | 2550 | 2760 | 2340 | 2550 | 2620 |
| Elongation, %[30] | 480 | 30 | 28 | 34 | 36 | 30 |
| Thickness of Strip, | | | | | | |
| mils | 58 | 59 | 59 | 59 | 58 | 59 |
| mm | 1.47 | 1.50 | 1.50 | 1.50 | 1.47 | 1.50 |
| Stiffness of strip,[31] g | 63 | 73 | 76 | 67 | 61 | 74 |

Footnotes for Table 1
[1]EVA #1 = "Elvax" 360 resin, E. I. du Pont de Nemours and Company, Inc. 25% VAc; 75% E; M.I. 2.0.
[2]EVA #2 = "Elvax" 3120 resin, E. I. du Pont de Nemours and Company, Inc., 7.5 VAc; 92.5% E; M.I. 1.2.
[3]"Circosol" 4240—A naphthenic process oil, ex Sun Oil Company, ASTM type 103; 2525 SUS at 100° F; approximate composition is $C_A = 21\%$; $C_N = 39\%$; $C_P = 40\%$.
[4]"Duponol" G—Anionic, alcohol sulfate, amine salt of saturated long chain alcohol.
[5]"Duponol" EP—Anionic, alcohol sulfate, diethanolamine lauryl sulfate, technical. [35% active ingredient content (A.I.C.)].
[6]"Duponol" ME—Anionic, alcohol sulfate, sodium salt of lauryl alcohol.
[7]"Duponol" SP—Anionic, alcohol sulfate, sodium salt. (35% A.I.C.).
[8]"Duponol" WAQE—Anionic, alcohol sulfate, sodium salt, with extremely low sulfated alcohol content. (30% A.I.C.)
[9]"Zelec" TY—Anionic antistatic agent. (50% A.I.C.)
[10]"Zelec" UN—Anionic antistatic agent-unneutralized fatty alcohol phosphate.
[11]"Zelec" NK—Anionic antistatic agent-fatty alcohol phosphate.
[12]"Zelec" NE—Anionic antistatic agent-fatty alcohol phosphate composition.
[13]"Zonyl" A—Nonionic, surface active agent, modified alkyl polyethylene glycol type.
[14]"Zonyl" FSP—Anionic fluorosurfactant. (35% A.I.C.).
[15]No. 9 whiting—Commercial ground limestone, CaCO₃, ex Georgia Marble Company. Medium ground, approximately 20 micron average.
[16]"Zonyl" FSN—Nonionic fluorosurfactant. (50% A.I.C.)
[17]"Merpol" DA—Nonionic liquid surfactant. Dyeing aid for synthetic fibers and wool. A nitrogen-containing ethylene oxide condensate. (60% A.I.C.).
[18]"Merpol" SH—Nonionic alcohol/ethylene oxide adduct. Detergent and wetting aid for textile and paper uses. (50% A.I.C.)
[19]"Merpol" SE—Nonionic alcohol/ethylene oxide adduct. Low foaming type, for textile and paper uses.
[20]"Product BCO"—Amphoteric surfactant; a C—alkyl betaine. (25% A.I.C.), a product of E. I. du Pont de Nemours and Company.
[21]"Alkanol" ND—Anionic; a dyeing assistant - sodium alkyl diaryl sulfonate. (45% A.I.C.)
[22]"Alkanol" XC—Anionic; surface tension reducer; sodium alkyl naphthalene sulfonate.
[23]"Alkanol" S—Anionic; dispersing/solubilizing agent; tetrahydronaphthalene sodium sulfonate.
[24]"Alkanol" DOA—Polymeric dispersant for nonaqueous systems. (50% A.I.C.)
[25]"Avitex" LCP—Cationic; quaternary ammonium salt. (50% A.I.C.)
[26]"Petrowet"—Anionic; saturated hydrocarbon sodium sulfonate; wetting and penetrating agent. (25% A.I.C.)
[27]"Avitone" A—Anionic; coating lubricant and plasticizer to prevent paper from sticking to dryers; textile softener. (75% A.I.C.)
[28]ASTM D1238, Procedure A, Condition E; units are dg/min.
[29]Referred to water.
[30]Tensile strength and elongation measurements made on Instron Tester using ASTM Method D1708 at crosshead speed of 2 in. (5.1 cm)/min. Samples are 0.876 in. (2.23 cm) × 0.187 in. (0.47 cm) in size, at strip thickness shown in table.
[31]Stiffness of strip measured by placing a 1 in. × 6 in. (2.54 cm × 15.2 cm) strip on a platform scale, and measuring the force required to make the ends of the test strip meet, at room temperature.
Note:
"Alkanol"
"Avitex"
"Avitone"
"Duponol"
"Merpol"
"Petrowet"
"Zelec"
"Zonyl"
All are products of E. I. du Pont de Nemours and Company and are registered trademarks. Where an active ingredient content is not indicated, the product as supplied contains 95% or more of the active ingredient.

For the most effective additives, numbers 1, 3, 8, 9, 10 and 18, the small amount of additive employed showed several totally unexpected benefits:

The elongation for the blends, versus that of Comparative Example 1, is enhanced by a factor of from 18 to 22—far beyond any predictable benefit.

The stiffness of the strip was reduced by about ⅓, in most instances.

The melt index of the blend nearly doubled for most blends.

The tensile strength was reduced by about 50%—but still, at the 350 psi level, was clearly high enough to perform well in most end uses.

The "toughness" of the blend—defined as the product of the tensile strength in psi and the elongation in percent—has risen sharply. The "toughness" for Comparative Example 1 is about 650×25%, or slightly over 16,000. By contrast, the "toughness" range for the six most effective additives was from 128,000 to 220,000, with an average toughness value of 173,000. This tenfold enhancement is totally unpredictable from any information known to us.

The reduction in both stiffness and melt index values is also of considerable significance. As will be shown later, these shifts open the way to adding increased amounts of fillers, while maintaining acceptable levels for both elongation and "toughness" of the blend.

EXAMPLES 24 TO 36

In view of the large differences in effectiveness noted in Table 1, a series of further exploratory tests was initiated. The goals were two-fold—to determine the minimum effective levels needed for some of the highly effective additives, and, in addition, to determine whether use of higher concentrations would result in enhancement of elongation. The key findings are summarized in Table 2, again using the blend of Comparative Example 1 as a yardstick. Composition and property data from Table 1, Examples 3, 7, 8, and 21 have been included again to emphasize the unusual results attainable through inclusion of surfactants.

The first series of comparisons was made to determine the minimum effective level for additive No. 3 in blends which contained 72.5% filler, as compared to the base case, C-1, which had an elongation value of 25%. At 0.25% inclusion of Additive No. 3, the elongation value was 560%. Reduction of the Additive No. 3 level—Ex. 24—to 0.15% yielded an elongation of 360%—still over 14 times than for C-1. Ex. 25 shows that 0.12% of Additive No. 3 was only modestly effective—the elongation measured 36%—better than that for C-1, but far below that for Ex. 24.

A parallel experimental series was then made to determine the effective minimum amount for Additive No. 8. (C-1, vs. Ex. 8, 26, 27 and 28). In this series, the astounding improvement in properties persisted even at levels for Additive No. 8 of only 0.12%. However, at 0.09%, the knife-edge was crossed, and elongation fell from 440% (Ex. 27) to only 33% (Ex. 28). Some benefit remained, but it was modest. We are unaware of anything in the prior art that would disclose such unusual behavior for a surfactant.

Additive No. 7, as noted earlier (Ex. 7), produced a significant but relatively small (ca. 100%) improvement in elongation vs. the base case, at 0.25% additive level. Increasing the additive level to 0.5% (Ex. 29) produced a dramatic increase in elongation, to 540%, a totally unpredictable enhancement. Even more surprisingly, further addition of Additive No. 7 (Examples 30, 31 and 32) to as high as 4.0% did not produce any further improvement. Indeed, at the 4% additive level, the test plaques pressed from the composition showed a moderate amount of process oil exudation at the surface. All other compositions up to this point showed no tendency toward "blooming" or exudation of process oil.

The same test approach was also tried with Additive No. 21, which, as sold, contains only 50% active ingredient. Initially (Ex. 21), at the 0.25% additive level, the elongation enhancement, to 34%, was modest. Use of 0.5% additive (Ex. 33) caused a further enhancement to 47%—desirable, but not outstanding. But, at 1%, the elongation rose rapidly to 580%. (Data are not included in Table 2, but the same effects occurred when Additive No. 2, which, as supplied, contains only 35% active ingredient, was tested at higher levels.)

TABLE 2

EFFECT OF CONCENTRATION OF SURFACE ACTIVE AGENTS OF SELECTED ADDITIVES FROM TABLE 1

| EXAMPLE NO | C-1 | 3 | 24 | 25 | 8 | 26 | 27 | 28 |
|---|---|---|---|---|---|---|---|---|
| EVA No. 1 | 16.2 | 16.2 | 16.2 | 16.2 | 16.2 | 16.2 | 16.2 | 16.2 |
| EVA No. 2 | 4.0 | 4.0 | 4.0 | 4.0 | 4.0 | 4.0 | 4.0 | 4.0 |
| PROCESS OIL - "CIRCOSOL" 4240 | 7.3 | 7.3 | 7.3 | 7.3 | 7.3 | 7.3 | 7.3 | 7.3 |
| Filler - No. 9 Whiting | 72.5 | 72.5 | 72.5 | 72.5 | 72.5 | 72.5 | 72.5 | 72.5 |
| Additive No. 3 | | 0.25 | 0.15 | 0.12 | | | | |
| Additive No. 8 | | | | | 0.25 | 0.15 | 0.12 | 0.09 |
| Additive No. 7 | | | | | | | | |
| Additive No. 21 | | | | | | | | |
| Physical Properties | | | | | | | | |
| MI | 2.2 | 3.4 | 2.9 | — | 4.3 | 3.4 | — | — |
| SP. GR. | 1.82 | 1.82 | — | — | 1.83 | — | — | — |
| Tensile Strength | | | | | | | | |
| PSI | 650 | 320 | 360 | 340 | 290 | 400 | 420 | 350 |
| kPa | 4480 | 2200 | 2480 | 2340 | 2000 | 2760 | 2900 | 2410 |
| Elongation, % | 25 | 560 | 360 | 36 | 510 | 510 | 440 | 33 |
| Thickness of Strip, | | | | | | | | |
| mils | 62 | 59 | 59 | 59 | 58 | 59 | 59 | 59 |
| mm | 1.57 | 1.50 | 1.50 | 1.50 | 1.47 | 1.50 | 1.50 | 1.50 |
| Stiffness of strip, g | 75 | 59 | 73 | 73 | 52 | 66 | 77 | 79 |

| EXAMPLE NO | 7 | 29 | 30 | 31 | 32 | 21 | 33 | 34 | 35 | 36 |
|---|---|---|---|---|---|---|---|---|---|---|
| EVA No. 1 | 16.2 | 16.2 | 16.2 | 16.2 | 16.2 | 16.2 | 16.2 | 16.2 | 16.2 | 16.2 |
| EVA No. 2 | 4.0 | 4.0 | 4.0 | 4.0 | 4.0 | 4.0 | 4.0 | 4.0 | 4.0 | 4.0 |
| PROCESS OIL - "CIRCOSOL" 4240 | 7.3 | 7.3 | 7.3 | 7.3 | 7.3 | 7.3 | 7.3 | 7.3 | 7.3 | 7.3 |
| Filler - No. 9 Whiting | 72.5 | 72.5 | 72.5 | 72.5 | 72.5 | 72.5 | 72.5 | 72.5 | 72.5 | 72.5 |
| Additive No. 3 | | | | | | | | | | |
| Additive No. 8 | | | | | | | | | | |

TABLE 2-continued
EFFECT OF CONCENTRATION OF SURFACE ACTIVE AGENTS OF SELECTED ADDITIVES FROM TABLE 1

| | | | | | | | | | | |
|---|---|---|---|---|---|---|---|---|---|---|
| Additive No. 7 | 0.25 | 0.50 | 1.0 | 2.0 | 4.0 | | | | | |
| Additive No. 21 | | | | | | 0.25 | 0.50 | 1.0 | 2.0 | 4.0 |
| Physical Properties | | | | | | | | | | |
| MI | — | 4.9 | — | — | 5.8 | — | — | 4.2 | — | 4.0 |
| SP. GR. | 1.84 | — | — | — | — | 1.84 | — | — | — | — |
| Tensile Strength | | | | | | | | | | |
| PSI | 280 | 360 | 370 | 340 | 300 | 340 | 340 | 420 | 370 | 380 |
| kPa | 1930 | 2480 | 2550 | 2340 | 2070 | 2340 | 2340 | 2900 | 2550 | 2620 |
| Elongation, % | 49 | 540 | 540 | 540 | 530 | 34 | 47 | 580 | 520 | 560 |
| Thickness of Strip, | | | | | | | | | | |
| mils | 59 | 59 | 59 | 59 | 59 | 59 | 59 | 59 | 59 | 59 |
| mm | 1.50 | 1.50 | 1.50 | 1.50 | 1.50 | 1.50 | 1.50 | 1.50 | 1.50 | 1.50 |
| Stiffness of strip, g | 68 | 29 | 34 | 29 | 16 | 67 | 77 | 44 | 48 | 56 |

As with previous blends, the melt index doubled; the stiffness fell by 40%; the toughness rose well better than ten-fold; and the tensile strength dropped by about one-third. (All are compared to the values of the blend of C-1). A further increase in the additive level to 2% and to 4% did not produce a further change in the properties measured—but did not harm the overall product. In this instance (Ex. 36), the first signs of process oil migration were noticed on close examination—but probably would not interfere with the product for most sound-deadening or molding uses. Thus, when compounding highly-filled blends of this type, it is important to consider the amount of active ingredient contained in the additive.

In a few instances, not shown in Table 2, use of even 4% additive in this particular blend (i.e., based on C-1) produced very little overall effect. This was true for Additives No. 19 and 20. However, it is not possible to predict what will happen in all cases, and a trial series is strongly recommended for any doubtful case. For example, Additive No. 15 did not enhance blend elongation at a 2% level—but, at 4%, the elongation value rose to well over 400%. Thus, a 4% additive level, or even a higher concentration, may offer merit, and should not be dismissed arbitrarily.

EXAMPLES 37 TO 43, AND COMPARATIVE EXAMPLES 2 AND 3

Surfactants are effective in improving the elongation of highly filled blends even when no process oil is included in the system. This is shown by the data of Table 3. The blends of Comparative Examples 2 and 3 are at 70% and 75% filler levels, respectively. The melt index values are very low, and elongation values are poor, particularly in view of the high resin levels used. (See, for comparison, blend C-1, Table 1.) The blends are also very stiff, which would present difficulty in some end uses where flexibility is important, such as sound-deadening textile constructions for automotive use.

Examples 37 through 41 show the striking and unexpected enhancement in elongation attainable through inclusion of relatively small amounts of surfactants. Examples 37 and 38 were made at 72.5% filler loading—one might predict elongation values, based on the data of Comparative Examples 1 to 3, of about 30% to 40% at best. Instead, use of 1% and 2% Additive No. 8 increased the elongation value by a factor of 18 from the anticipated level. In addition, a very large reduction in stiffness occurred. The blends now will pass an ambient-temperature "zero-T" bend, which C-3 does not pass.

Examples 39, 40 and 41 show that the beneficial effects discussed above can be attained with as little as 0.5% of Additive No. 8; or, at 1% additive level, excellent results can be attained even at a 75% filler loading.

As might be expected, highly filled plasticizer-free EVA blends are hard to mix, and reproducible results are difficult to attain. As will be shown later (Table 7), the fineness of the filler is also an important variable, which is also of great importance in unplasticized systems, because wet-out of the filler is difficult to attain. Where doubt or difficulty exists, the amount of surface active agent should be increased, probably to the 2%–4% level.

Example 42 was prepared to determine the effect of a further increase in filler loading upon the properties of an unplasticized blend. Now, at 80% $CaCO_3$ load, the blend will no longer flow through a standard Melt Index test unit. This, in turn, means the blend can no longer be processed at practical rates using many commercial extruders, as prohibitive head pressure would be needed. Nevertheless, the elongation value remained well above 400%, indicating that other uses (such as molding) might be practical, at or above 80% filler loading, when $CaCO_3$ is used as the filler.

TABLE 3
EFFECT OF INCLUSION OF SURFACTANTS IN BINARY BLENDS OF EVA AND $CaCO_3$

| EXAMPLE NO | C-2 | C-3 | 37 | 38 | 39 | 40 | 41 | 42 | 43 |
|---|---|---|---|---|---|---|---|---|---|
| EVA No. 1 | 30 | 25 | 26.5 | 25.5 | 27.5 | — | 24.0 | — | — |
| EVA No. 3[1] | — | — | — | — | — | 24.0 | — | — | 19.0 |
| E/VA/MAA Resins No. 1[2] | — | — | — | — | — | — | — | 19.0 | — |
| "CIRCOSOL" 4240 | 0 | 0 | 0 | 0 | 0 | 0 | 0 | 0 | 1.0 |
| Filler - No. 9 Whiting | 70 | 75 | 72.5 | 72.5 | 72.5 | 75.0 | 75.0 | 80.0 | 79.0 |
| Additive No. 8 | 0 | 0 | 1.0 | 2.0 | 0.5 | 1.0 | 1.0 | 1.0 | 1.0 |
| Physical Properties | | | | | | | | | |
| MI | 0.44 | <0.2 | 0.58 | — | 0.78 | 1.1 | 0.5 | No flow | 1.3 |
| SP. GR. | 1.8 | 1.9 | — | — | 1.83 | 1.9 | 1.9 | 2.0 | 2.0 |
| Tensile Strength | | | | | | | | | |
| PSI | 710 | 1140 | 720 | 540 | 716 | 530 | 610 | 420 | 360 |
| kPa | 4900 | 7870 | 4970 | 3730 | 4940 | 3660 | 4210 | 2900 | 2480 |

TABLE 3-continued

| | EFFECT OF INCLUSION OF SURFACTANTS IN BINARY BLENDS OF EVA AND CaCO₃ | | | | | | | | |
|---|---|---|---|---|---|---|---|---|---|
| EXAMPLE NO | C-2 | C-3 | 37 | 38 | 39 | 40 | 41 | 42 | 43 |
| Elongation, % | 38 | 21 | 540 | 540 | 450 | 570 | 510 | 440 | 640 |
| Thickness of Strip, | | | | | | | | | |
| mils | 58 | 59 | 59 | 59 | 59 | 59 | 59 | 62 | 61 |
| mm | 1.47 | 1.50 | 1.50 | 1.50 | 1.50 | 1.50 | 1.50 | 1.57 | 1.55 |
| Stiffness of strip, g | 145 | 150 | 57 | 88 | 135 | 66 | 105 | 110 | 50 |

Footnotes for Table 3
[1] EVA No. 3 = "Elvax" 260 resin; 28% VAc, 72% E; 6 M.I., E. I. du Pont de Nemours and Company, Inc.
[2] E/VA/MAA Resin #1 = "Elvax" 4260 resin; ethylene/vinyl acetate/methacrylic acid terpolymer; 71% ethylene/28% vinyl acetate/1% methacrylic acid; MI - 6.0

Example 43 was included to show the additional substantial benefits which can result for blends of the type of Ex. 42, if only a very low (1%) amount of plasticizer is added. Now, the MI value again is in a practical range for commercial extruders; the elongation, at 640%, shows that a still higher filler level should be practicable; and the stiffness has been sharply reduced.

As will be shown later, when a dense filler such as BaSO₄ is used, the filler level can be increased to well above the 80% level.

EXAMPLES 44 TO 52 AND COMPARATIVE EXAMPLES 4 TO 12

The use of blends of polymers has long been an art practiced by skilled compounders. Indeed, U.S. Pat. No. 4,191,798 points out (col. 9, 1. 4-7; col. 15, 1. 38-42; col. 18, 1. 6-9) that minor property changes can be effected in highly filled ethylene copolymer blends which contain process oil by adding unrelated resins, rubbers, elastomers, extenders, etc. Table 4 shows the types of property changes wich can be effected through the use of hydrocarbon rubber (e.g., E/P or EPDM types) as an additive in EVA/process oil/fitter systems.

The overall "base case" for comparisons made is Comparative Example 1, which contains 72.5% filler and 7.3% process oil (as do all other compositions in Table 4), plus 20.2% EVA resin. Comparative Example 4 is identical to it, except that the EVA resin has been totally replaced by E/P resin No. 1. As a result of the change, the blend has become far softer and has a far higher elongation value. However, the negative aspects are severe—the composition of Comparative Example 4 is no longer moldable; it has a "no-flow" result on a melt indexer, which indicates high difficulty in extruding it, and it will have a significantly higher cost per pound.

TABLE 4

| | EFFECT OF INCLUSION OF HYDROCARBON RUBBER IN BLENDS OF EVA - PROCESS OIL - CaCO₃ - SURFACTANT | | | | | | | | | |
|---|---|---|---|---|---|---|---|---|---|---|
| EXAMPLE NO | C-1 | 8 | C-4 | 44 | C-5 | 45 | C-6 | 46 | C-7 | 47 |
| EVA #1[1] | 16.2 | 16.2 | — | — | 8.1 | 8.1 | 12.2 | 12.2 | — | — |
| EVA #2[2] | 4.0 | 4.0 | — | — | 2.0 | 2.0 | 3.0 | 3.0 | — | — |
| "CIRCOSOL" 4240 | 7.3 | 7.3 | 7.3 | 7.3 | 7.3 | 7.3 | 7.3 | 7.3 | 7.3 | 7.3 |
| Filler - No. 9 Whiting | 72.5 | 72.5 | 72.5 | 72.5 | 72.5 | 72.5 | 72.5 | 72.5 | 72.5 | 72.5 |
| Additive No. 8 | — | 0.25 | — | 0.25 | — | 0.25 | — | 0.25 | — | 0.25 |
| E/P Resin No. 1[1] | — | — | 20.2 | 20.2 | 10.1 | 10.1 | 5.0 | 5.0 | | |
| E/P Resin No. 2[2] | | | | | | | — | — | 20.2 | 20.2 |
| E/P Resin No. 3[3] | | | | | | | | | | |
| Physical Properties | | | | | | | | | | |
| MI | 22 | 4.3 | No flow | No flow | 0.2 | No flow | 0.95 | 1.3 | No flow | No flow |
| SP. GR. | 1.82 | 1.83 | 1.82 | 1.78 | 1.82 | 1.83 | 1.78 | 1.79 | 1.85 | 1.85 |
| Tensile Strength | | | | | | | | | | |
| PSI | 650 | 290 | 270 | 240 | 290 | 320 | 350 | 310 | 455 | 420 |
| kPa | 4480 | 2000 | 1860 | 1650 | 2000 | 2210 | 2410 | 2140 | 3140 | 2900 |
| Elongation, % | 25 | 510 | 710 | 880 | 69 | 710 | 35 | 640 | 800 | 940 |
| Thickness of Strip, | | | | | | | | | | |
| mils | 62 | 58 | 59 | 59 | 59 | 59 | 59 | 59 | 59 | 59 |
| mm | 1.57 | 1.47 | 1.50 | 1.50 | 1.50 | 1.50 | 1.50 | 1.50 | 1.50 | 1.50 |
| Stiffness of strip, g | 75 | 52 | 34 | 22 | 59 | 34 | 74 | 41 | 40 | 26 |
| EXAMPLE NO | C-8 | 48 | C-9 | 49 | C-10 | 50 | C-11 | 51 | C-12 | 52 |
| EVA #1 | 8.1 | 8.1 | 12.2 | 12.2 | — | — | 8.1 | 8.1 | 12.2 | 12.2 |
| EVA #2 | 2.0 | 2.0 | 3.0 | 3.0 | — | — | 2.0 | 2.0 | 3.0 | 3.0 |
| "CIRCOSOL" 4240 | 7.3 | 7.3 | 7.3 | 7.3 | 7.3 | 7.3 | 7.3 | 7.3 | 7.3 | 7.3 |
| Filler - No. 9 Whiting | 72.5 | 72.5 | 72.5 | 72.5 | 72.5 | 72.5 | 72.5 | 72.5 | 72.5 | 72.5 |
| Additive No. 8 | — | 0.25 | — | 0.25 | — | 0.25 | — | 0.25 | — | 0.25 |
| E/P Resin No. 1[1] | | | | | | | | | | |
| E/P Resin No. 2[2] | 10.1 | 10.1 | 5.0 | 5.0 | | | | | | |
| E/P Resin No. 3[3] | | | | | 20.2 | 20.2 | 10.1 | 10.1 | 5.0 | 5.0 |
| Physical Properties | | | | | | | | | | |
| MI | No flow | No flow | 1.2 | 1.9 | No flow | No flow | No flow | No flow | 1.04 | 1.5 |
| SP. GR. | 1.79 | 1.79 | 1.82 | 1.80 | 1.74 | 1.74 | 1.80 | 1.84 | 1.81 | 1.80 |
| Tensile Strength | | | | | | | | | | |
| PSI | 330 | 400 | 370 | 390 | 18 | <10 | 210 | 100 | 270 | 240 |
| kPa | 2280 | 2760 | 2550 | 2690 | 120 | <70 | 1450 | 690 | 1860 | 1650 |
| Elongation, % | 53 | 790 | 34 | 740 | 360 | 850 | 120 | 460 | 67 | 590 |
| Thickness of Strip, | | | | | | | | | | |
| mils | 59 | 59 | 59 | 59 | 59 | 59 | 59 | 59 | 59 | 59 |
| mm | 1.50 | 1.50 | 1.50 | 1.50 | 1.50 | 1.50 | 1.50 | 1.50 | 1.50 | 1.50 |

TABLE 4-continued
EFFECT OF INCLUSION OF HYDROCARBON RUBBER IN BLENDS OF EVA - PROCESS OIL - CaCO₃ - SURFACTANT

| Stiffness of strip, g | 69 | 34 | 77 | 38 | 17 | 14 | 43 | 25 | 54 | 26 |
|---|---|---|---|---|---|---|---|---|---|---|

Footnotes for Table 4
[1] Ethylene/Propylene Resin #1 = "Vistalon" 3708; Exxon Chemicals Company; Ethylene/Propylene/Diene Terpolymer. Sp. Gr. 0.86; ML 1 + 8 (260° F.) = 44-55. Diene used is 5-ethylidene-2-norbornene.
[2] Ethylene/Propylene Resin #2 = "Nordel" 1560 Hydrocarbon Rubber-Du Pont Company; Sulfur-Curable Polymer Based on Ethylene/-Propylene/1,4-Hexadiene. Sp. Gr. 0.85; ML 1 + 4 (250° F.) = 60.
[3] Ethylene/Propylene Resin #3 = "Nordel" 1470 Hydrocarbon Rubber-Du Pont Company. A Sulfur-Curable Polymer Based on Ethylene/-Propylene/ and a Nonconjugated Diene. Sp. Gr. 0.85; ML 1 + 4 (250° F.) = 70 ± 6.

At first glance, it might appear that mixing of Compositions C-1 and C-4 might produce an average system of potential attractiveness. However, when this was done (C-5 and C-6), the initially high elongation of C-4 was essentially destroyed. Also, the stiffness fell, but less than might have been expected, and melt index values remained quite low. Note now (Examples 8, 44, 45, and 46) the unusual and unpredictable effects which resulted when 0.25% of Additive No. 8 was added to the compositions of the corresponding comparative examples. In the case of the unmodified E/P rubber, the percentage of improvement was quite modest (about 30%). By contrast, the blends which contained up to 50% EVA resin (of the total resin component) showed a ten- to twenty-fold increase in elongation value.

The balance of the Examples in Table 4 confirms the results of the earlier Examples summarized in this Table. The change in termonomer used in making the E/P rubber and the higher viscosity level for it did not alter the effects obtained with E/P resin #1. The fundamental conclusion is clear—the use of surfactants enhances the performance of EVA resins; key properties of E/P or EPDM rubber are relatively unaffected by employment of a surface active agent.

EXAMPLES 53 TO 58 AND COMPARATIVE EXAMPLES 13 TO 18

The benefits of addition of surfactants to ethylene/vinyl acetate copolymers extends also to a wide variety of other copolymers—including the so-called "polyethylenes," which at times may contain small amounts of other olefinic materials as a comonomer. For example, in Table 5 the formulations of Comparative Example No. 13 and example No. 53 show the results of use of surfactant No. 8 at 0.25% as an additive in a blend where high-density polyethylene (HDPE) is the sole polymeric material; the remaining ingredients are filler and process oil.

TABLE 5
EFFECT OF INCLUSION OF HOMOPOLYMER RESINS IN BLENDS OF EVA - PROCESS OIL - CaCO₃ SURFACTANT

| EXAMPLE NO | C-13 | 53 | C-14 | 54 | C-15 | 55 | C-16 | 56 | C-17 | 57 | C-18 | 58 |
|---|---|---|---|---|---|---|---|---|---|---|---|---|
| EVA No. 1[1] | — | — | 8.1 | 8.1 | 12.2 | 12.2 | — | — | 8.1 | 8.1 | 12.2 | 12.2 |
| EVA No. 2[2] | — | — | 2.0 | 2.0 | 3.0 | 3.0 | — | — | 2.0 | 2.0 | 3.0 | 3.0 |
| Ethylene Polymer No. 1[1] | 20.2 | 20.2 | 10.1 | 10.1 | 5.0 | 5.0 | — | — | — | — | — | — |
| Ethylene Polymer No. 2[2] | — | — | — | — | — | — | 20.2 | 20.2 | 10.1 | 10.1 | 5.0 | 5.0 |
| PROCESS OIL - "CIRCOSOL" 4240 | 7.3 | 7.3 | 7.3 | 7.3 | 7.3 | 7.3 | 7.3 | 7.3 | 7.3 | 7.3 | 7.3 | 7.3 |
| Filler - No. 9 Whiting | 72.5 | 72.5 | 72.5 | 72.5 | 72.5 | 72.5 | 72.5 | 72.5 | 72.5 | 72.5 | 72.5 | 72.5 |
| Additive No. 8 | — | 0.25 | — | 0.25 | — | 0.25 | — | 0.25 | — | 0.25 | — | 0.25 |
| Physical Properties | | | | | | | | | | | | |
| MI | 1.8 | 3.5 | 2.2 | 2.9 | 2.8 | 3.7 | 0.9 | 1.5 | 1.1 | 1.05 | 1.8 | 1.6 |
| SP. GR. | 1.78 | — | 1.83 | 1.82 | 1.86 | 1.82 | 1.84 | 1.82 | 1.82 | 1.82 | 1.83 | 1.81 |
| Tensile Strength | | | | | | | | | | | | |
| PSI | 480 | 640 | 1110 | 420 | 640 | 400 | 460 | 460 | 570 | 430 | 460 | 390 |
| kPa | 3310 | 4410 | 7660 | 2900 | 4410 | 2760 | 3180 | 3180 | 3930 | 2960 | 3180 | 2690 |
| Elongation, % | <10 | 78 | 11 | 270 | 17 | 460 | 43 | 460 | 17 | 530 | 23 | 550 |
| Thickness of Strip, | | | | | | | | | | | | |
| mils | 58 | 57 | 59 | 59 | 57 | 59 | 59 | 59 | 59 | 59 | 59 | 59 |
| mm | 1.47 | 1.44 | 1.50 | 1.50 | 1.44 | 1.50 | 1.50 | 1.50 | 1.50 | 1.50 | 1.50 | 1.50 |
| Stiffness of strip, g | 390 (Broke) | 240 | 153 | 100 | 240 | 70 | 190 | 100 | 100 | 67 | 84 | 65 |

Footnotes for Table 5
[1] Polymer #1 = "Alathon" 7835 - High Density (0.96) Polyethylene; M.I. = 3.0; E. I. du Pont de Nemours and Company.
[2] Polymer #2 = "Dowlex" 2045 - Linear Low density (0.913) Polyethylene. Ethylene/α-Olefin Copolymer (About 15% Octene Comonomer); M.I. = 1.14; Dow Chemical Company.

A major increase in elongation occurs, as does a reduction in stiffness and an increase in melt index. The next two pairs of examples (C-14 and Ex. 54; C-15 and Ex. 55) show that this effect continues when EVA resins are also present, at 75% and at 50% of the total polymer fraction.

The effects noted occur in essentially the same way when the HDPE is replaced instead with a linear low-density polyethylene (LLDPE). Once again, small amounts of a surfactant added to the comparative example blends, at widely varying LLDPE content, produce very substantial increases in elongation, plus reduction in stiffness level.

EXAMPLE 59 TO 64

U.S. Pat. No. 4,191,798 stresses the art of proper selection of a process oil for special uses. In particular, most oils classed as naphthenic and aromatic process oils will produce highly filled EVA blends that are nonbleeding or "dry" to the tough. Conversely, otherwise identical blends made with most paraffinic process oils will "bleed", and thus are useful only in specialty applications.

Table 6 shows the results of including either Surfactant No. 3 or No. 9 in typical highly filled EVA blends made with the three different process oil types. The blends of Comparative Example 1 and Examples 3 and 9 are all made using a readily available naphthenic process oil, "Circosol" 4240. These compositions do not bleed. If a different naphthenic oil, "Tufflo" 2000P, or an aromatic oil, "Sundex" 790, is substituted for "Circosol" 4240, the overall results are very similar to those attained for Examples 3 or 9 (see Examples 59, 60 and 62, 63); that is, in comparison to the C-1 blend, the elongation values are excellent; melt index values are higher; the stiffness of the blend is appreciably lower, and the sacrifice in tensile strength is modest. Most of these statements also apply to the blends (Ex. 62 and 65) which were made with a paraffinic process oil. The principal differences are that the blends are now far softer than the C-1 blend, and the blends "bleed" severely.

In compounding highly filled EVA blends which contain process oils and additives, it is clear that the compounder must take great care to the certain the final product will prove suitable for its intended use. Interactions can well occur which might lead to unanticipated side effects. For example, we have made some blends which showed no tendency to "bloom" when the additive level was low—e.g., 0.25 to 0.5%. In a few instances, as levels of additives were increased, the "non-blooming" blends would begin to "bloom". Any blend must thus be checked with considerable care to be certain all final goals are met—not just the enhancement of one particular property.

The synthetic organic surfactants are not the only class of additives which can enhance elongation and modify stiffness, melt index, etc. at very low addition levels. Naturally occurring fatty acids and selected derivatives of them can also produce similar results. This is the subject of a co-pending application, Ser. No. 339,468, filed Jan. 15, 1982. Other additives also can be used to produce beneficial effects. For example, organosilanes have some degree of activity in enhancing the elongation of filled EVA blends. In addition, they caused an increase in tensile strength, which is quite different from all other additives studies. Thus, the silanes may prove highly attractive in combination with organic surfactants. Also organotitanates have been used in filled systems to improve pigment wetting or dispersion. Here, too, combining the titanates with the surfactants disclosed herein should provide unusual blend properties for specialty uses.

TABLE 6
EFFECT OF VARYING THE TYPE OF PROCESS OIL IN BLENDS OF EVA - PROCESS OIL - $CaCO_3$ - SURFACTANT

| EXAMPLE NO | C-1 | 3 | 9 | 59 | 60 | 61 | 62 | 63 | 64 |
|---|---|---|---|---|---|---|---|---|---|
| EVA No. 1[1] | 16.2 | 16.2 | 16.2 | 16.2 | 16.2 | 16.2 | 16.2 | 16.2 | 16.2 |
| EVA No. 2[2] | 4.0 | 4.0 | 4.0 | 4.0 | 4.0 | 4.0 | 4.0 | 4.0 | 4.0 |
| Filler - No. 9 Whiting | 72.5 | 72.5 | 72.5 | 72.5 | 72.5 | 72.5 | 72.5 | 72.5 | 72.5 |
| Additive No. 3 | — | 0.25 | — | 0.25 | 0.25 | 0.25 | — | — | — |
| Additive No. 9 | — | — | 0.25 | — | — | — | 0.25 | 0.25 | 0.25 |
| PROCESS OIL: | | | | | | | | | |
| "CIRCOSOL" 4240 | 7.3 | 7.3 | 7.3 | — | — | — | — | — | — |
| "TUFFLO" 2000P[1] | — | — | — | 7.3 | — | — | 7.3 | — | — |
| "SUNDEX" 790[1] | — | — | — | — | 7.3 | — | — | 7.3 | — |
| "SUNPAR" 2280[1] | — | — | — | — | — | 7.3 | — | — | 7.3 |
| Physical Properties | | | | | | | | | |
| MI | 2.2 | 3.4 | 3.8 | 3.7 | 3.3 | 3.3 | 3.9 | 3.5 | 4.3 |
| SP. GR. | 1.82 | 1.82 | — | 1.86 | 1.82 | 1.82 | 1.87 | 1.82 | 1.86 |
| Tensile Strength | | | | | | | | | |
| PSI | 650 | 320 | 400 | 420 | 480 | 380 | 400 | 490 | 400 |
| kPa | 4480 | 2210 | 2760 | 2900 | 3310 | 2620 | 2760 | 3380 | 2760 |
| Elongation, % | 25 | 560 | 550 | 610 | 540 | 540 | 580 | 540 | 560 |
| Thickness of Strip, | | | | | | | | | |
| mils | 62 | 59 | 59 | 58 | 60 | 59 | 58 | 60 | 58 |
| mm | 1.57 | 1.50 | 1.50 | 1.47 | 1.52 | 1.50 | 1.47 | 1.52 | 1.47 |
| Stiffness of strip, g | 75 | 59 | 51 | 45 | 57 | 35 | 56 | 56 | 31 |

Footnotes for Table 6
[1]The description and physical properties of these process oils are:

| | ASTM | | | Viscosity[B] | Carbon Atoms, % | | | |
|---|---|---|---|---|---|---|---|---|
| | Type[A] | Type | Sp. Gr. | SUS-100° F. | $C_A$ | $C_N$ | $C_P$ | Mfg[C] |
| "Circosol" 4240 | N | 103 | 0.95 | 2525 | 21 | 39 | 40 | Sun |
| "Tufflo" 2000P | N | — | 0.95 | 2150 | 20 | 39 | 41 | Arco |
| "Sundex" 790 | A | 102 | 0.98 | 3500 | 37 | 28 | 35 | Sun |
| "Sunpar" 2280 | P | 104B | 0.89 | 2907 | 4 | 25 | 71 | Sun | wherein:
[A]N = Naphthenic oil
A = Aromatic oil
P = Paraffinic oil
[B]SUS = Saybolt Universal Seconds
[C]Sun = Sun Oil Company
Arco = Atlantic Richfield Co.

EXAMPLES 65 TO 70 AND COMPARATIVE EXAMPLES 19 AND 20

The filler used in all of the Examples heretofore was No. 9 whiting, which is a logical choice because of reasonable purity, appropriate particle size, availability of limestone, and a moderate price. However, where special effects are desired, it is possible to change the filler type, both physically and chemically. In so doing, filler morphology can also be changed widely. Some of these changes are illustrated in Table 7.

Comparative Example 19 shows properties for a 60%-filled system where ¼ of the whiting filler has been replaced by clay. Clay is a very fine, active, plate-like filler, not normally used in EVA systems, as the clay attacks EVA resins (cf. U.S. Pat. No. 4,222,924-blends of clay, processing oil, and EVA copolymers) unless a protective agent such as process oil is present. Further, the resin system has been changed to evaluate a high MI type, EVA No. 4, at 400 MI. Despite these two marked changes in composition, once again, the employment of 0.5% of Additive No. 8, as in Example 65, produces a six-fold increase in elongation, and a 50+% reduction in stiffness for the compound.

Further changes in filler content are shown by Examples C-20 and 66, where "Atomite" filler is used to replace No. 9 whiting. "Atomite" $CaCO_3$, is far finer than is No. 9 whiting, nevertheless, 0.5% of Additive No. 9 produces a 30-fold elongation enhancement, a nearly three-fold melt index increase, and a modest reduction in stiffness for the compound. Then, if the "Atomite" is replaced by the less-dense hydrated alumina (Example 67), a further increase in filler surface results. At this point, the amount of additive is no longer sufficient—and the elongation of the blend of ex. 67 drops very sharply to only 25%. By further increasing the level of additive to about 4%, (Example 68), the elongation of the blend is restored to the 600% level.

was prepared, with a barytes level of 88% by weight——containing only 6.5% resin binder. Nevertheless, by use of 1% of Additive No. 9, the final product has a MI value of 5—thus indicating extrudability—an elongation value of 700%, and a very low stiffness level. Thus, it appears entirely practical, with barytes, to make a useful EVA-blend with 90–94% filler loading.

While not demonstrated, one skilled in the art can readily conceive of other variants possible with still different filler types. For example, low-density fillers such as yarns, wood fiber, etc., when used at 20–60% filler level, should provide products which can be formed into useful constructions. Alternately, very dense fillers, such as lead, lead oxide, etc. should readily permit preparation of surfactant-enhanced compositions which will contain in the range of 95–96% filler—yet be flexible, extrudable, and have a Sp. Gr. of well above 4. (The Sp. Gr. of litharge, PbO, is 9.3, while that of metallic lead is over 11.)

EXAMPLES 71 TO 75 AND COMPARATIVE EXAMPLES 21 TO 25

In addition to the good results attained with E/VA

TABLE 7
EFFECTS OF VARYING THE TYPE OF FILLER IN BLENDS OF EVA - PROCESS OIL - FILLER - SURFACE ACTIVE AGENTS

| EXAMPLE NO | C-19 | 65 | C-20 | 66 | 67 | 68 | 69 | 70 |
|---|---|---|---|---|---|---|---|---|
| EVA No. 4[1] | 12.5 | 12.5 | — | — | — | — | — | — |
| EVA No. 1 | 12.5 | 12.5 | 16.2 | 16.2 | 16.2 | 16.2 | 16.2 | 6.5 |
| EVA No. 2 | — | — | 4.0 | 4.0 | 4.0 | 4.0 | 4.0 | — |
| PROCESS OIL - "CIRCOSOL" 4240 | 15 | 15 | 7.3 | 7.3 | 7.3 | 7.3 | 7.3 | 5.5 |
| Filler No. 9 Whiting | 45 | 45 | — | — | — | — | — | — |
| Suprex Clay | 15 | 15 | — | — | — | — | — | — |
| "Atomite"[2] | — | — | 72.5 | 72.5 | — | — | — | — |
| Hydrated Alumina[3] | — | — | — | — | 72.5 | 72.5 | — | — |
| #22 Barytes[4] | — | — | — | — | — | — | 72.5 | 88.0 |
| Additive No. 8 | 0 | 0.5 | — | — | — | — | — | — |
| Additive No. 9 | — | — | 0 | 0.5 | 0.5 | 4.0 | 0.5 | 1.0 |
| Physical Properties | | | | | | | | |
| MI | 59 | 60 | 1.8 | 4.8 | 1.9 | — | 14.0 | 5.0 |
| SP. GR. | — | — | 1.84 | 1.83 | 1.73 | 1.70 | 2.18 | 3.26 |
| Tensile Strength | | | | | | | | |
| PSI | 190 | 210 | 700 | 410 | 760 | 340 | 630 | 160 |
| kPa | 1310 | 1450 | 4830 | 2830 | 5240 | 2340 | 4340 | 1100 |
| Elongation, % | 103 | 630 | 20 | 600 | 25 | 600 | 730 | 700 |
| Thickness of Strip, | | | | | | | | |
| mils | 58 | 56 | 59 | 60 | 58 | 58 | 53 | 57 |
| mm | 1.47 | 1.42 | 1.50 | 1.52 | 1.47 | 1.47 | 1.35 | 1.45 |
| Stiffness of strip, g | 33 | 14 | 57 | 49 | 71 | 42 | 23 | 27 |

Footnotes for Table 7
[1]EVA #4 = "Elvax" 310 Resin, E. I. du Pont de Nemours and Company, Inc. 25% Vac; 75% E; MI = 400.
[2]"Atomite" - A finely ground (approximately 2.5 micron average) limestone filler, primarily $CaCO_3$, ex Thompson, Weinman Company, Cartersville, GA. 100% passes 325 mesh.
[3]Hydrated Alumina - Grade KC-100, $Al_2O_3.3H_2O$, 98% min. finer than 325 mesh, supplied by A. B. Wood Company, Charlotte, NC.
[4]No. 22 Barytes - A heavy filler which has a density of about 4.4 $g/cm^3$; primarily $BaSO_4$, ex Thompson, Weinman Co. Approx. 99.5% finer than 325 mesh.

The final Examples for Table 7 show the further effects possible through use of a dense filler. Barytes, 4.4 Sp. Gr., is a very satisfactory filler for systems which employ surfactants as additives to enhance blend properties, as shown by Examples 69 and 70. The elongation for Examples 69, at 730%, is far in excess of the needs for many sound-deadening sheet products. Example 70 resins, parallel tests summarized in Table 8 show that the same beneficial effects occur when E/EA, E/IBA, E/MMA, and E/VA/MAA resins are substituted for E/VA resins. In all cases, the addition of small amounts of Additives 8 or 9 enhanced elongation values for test strips by from 10 to over 30-fold. Also, strip stiffness was lowered appreciably in most instances.

TABLE 8
EFFECT OF SURFACE ACTIVE AGENTS ON BLENDS CONTAINING VARIOUS ETHYLENE COPOLYMERS, PROCESS OIL, AND FILLER

| EXAMPLE NO | C-21 | 71 | C-22 | 72 | C-23 | 73 | C-24 | 74 | C-25 | 75 |
|---|---|---|---|---|---|---|---|---|---|---|
| E/EA Resin #1[1] | 22.7 | 22.7 | — | — | — | — | — | — | — | — |
| E/IBA Resin #1[2] | — | — | — | — | 20.2 | 20.2 | — | — | — | — |
| E/MMA Resin #1[3] | — | — | — | — | — | — | 20.2 | 20.2 | — | — |
| E/VA/MAA Resin #2[4] | — | — | 16.2 | 16.2 | — | — | — | — | — | — |

TABLE 8-continued
EFFECT OF SURFACE ACTIVE AGENTS ON BLENDS CONTAINING VARIOUS ETHYLENE COPOLYMERS, PROCESS OIL, AND FILLER

| EXAMPLE NO | C-21 | 71 | C-22 | 72 | C-23 | 73 | C-24 | 74 | C-25 | 75 |
|---|---|---|---|---|---|---|---|---|---|---|
| E/MA Resin #1[5] | — | — | — | — | — | — | — | — | 17.6 | 17.6 |
| E/VA Resin #2 | — | — | 4.0 | 4.0 | — | — | — | — | — | — |
| "CIRCOSOL" 4240 | 7.3 | 7.3 | 7.3 | 7.3 | 7.3 | 7.3 | 7.3 | 7.3 | 6.4 | 6.4 |
| Filler - No. 9 Whiting | 70.0 | 70.0 | 72.5 | 72.5 | 72.5 | 72.5 | 72.5 | 72.5 | 76.0 | 76.0 |
| Additive No. 8 | — | 0.25 | — | — | — | — | — | — | — | 2.5 |
| Additive No. 9 | — | — | — | 0.25 | — | 1.0 | — | 1.0 | — | — |
| Physical Properties | | | | | | | | | | |
| MI | 2.8 | 2.9 | 5.8 | 5.5 | — | 9.3 | — | 9.8 | 3.3 | 38.0 |
| SP. GR. | 1.74 | 1.73 | 1.85 | 1.85 | 1.81 | 1.82 | 1.81 | 1.82 | 1.85 | 1.92 |
| Tensile Strength | | | | | | | | | | |
| PSI | 670 | 320 | 580 | 300 | 540 | 210 | 580 | 230 | 680 | 170 |
| kPa | 4620 | 2210 | 4000 | 2070 | 3730 | 1450 | 4000 | 1590 | 4700 | 1170 |
| Elongation, % | 11 | 330 | 34 | 330 | 23 | 325 | 22 | 350 | 12 | 320 |
| Thickness of Strip, | | | | | | | | | | |
| mils | 61 | 59 | 58 | 59 | 59 | 56 | 59 | 58 | 58 | 56 |
| mm | 1.55 | 1.50 | 1.47 | 1.50 | 1.50 | 1.42 | 1.50 | 1.47 | 1.47 | 1.42 |
| Stiffness of strip, g | 98 | 60 | 59 | 60 | 73 | 31 | 71 | 42 | 93 | 22 |

Footnotes for Table 8
[1]E/EA Resin #1 - Ethylene/ethyl acrylate copolymer, Grade DPDA 6182 NT; contains about 15% EA; 85% E; M.I. = about 1.5; ex Union Carbide Corporation.
[2]E/IBA Resin #1 - Ethylene/isobutyl acrylate copolymer; 20% IBA and 80% E; 2.5 M.I.
[3]E/MMA Resin #1 - Ethylene/methyl methacrylate copolymer; 18% MMA; 82% E; 2.2 M.I.
[4]E/VA/MAA Resin #2 = "Elvax" 4355 Resin; E. I. du Pont de Nemours and Company, Inc. Ethylene/vinyl acetate/methacrylic acid terpolymer; 74% E; 25% VAc; 1% MAA; 6.0 M.I.
[5]E/MA Resin #1 = Ethylene/methyl acrylate copolymer; 20% MA; 80% E; 2 M.I.

Tests employing an ethylene/methyl acrylate copolymer at different filler levels showed that blend properties are particularly and beneficially affected by inclusion of Additive No. 8, at a moderate (2.5%) level. The enhancement in elongation values from 12% for Comparative Example 25 to 320% for Example 75 is far beyond any prediction based on prior art. In addition, the over 10-fold increase in MI, and the 75% reduction in stiffness for comparable strips, are both spectacular.

EXAMPLES 76 TO 80 AND COMPARATIVE EXAMPLES 26 TO 29

Table 9 summarizes certain combinations that can be employed to augment the properties of highly-filled ethylene copolymer blends. Comparative Examples 1 and 26 show that the blend properties for C-1 can be enhanced by use of the polymer alloy principle. Addition of EVA No. 5 as a replacement for a part of the EVA No. 1 content improves the elongation of the blend of C-1 about 5-fold. (This discovery is the subject matter of and is more fully described in a pending application Ser. No. 273,420 filed June 15, 1981). However, when 1% of Additive No. 8 is included in the blend of C-26, there is an additional 4-fold enhancement of blend elongation (cf. Example 76).

The results of C-27 and Example 77 show another means to enhance blend properties. The 470% elongation shown by C-27 is far beyond what might be expected for this composition. The improvement resulted from inclusion of a small amount of polyester plasticizer in place of part of the process oil component. This discovery is the subject matter of and is more fully described in copending patent application Ser. No. 273,419, filed June 15, 1981. Inclusion of a small amount of Additive No. 8 (only 0.5%) will produce a further 15% improvement in elongation (Ex. 77) and, in addition, will increase the melt index nearly wo-fold and reduce the stiffness of the strip by almost one half. Thus, combining these ingredients provides a skilled formulator with additional means to attain a desired balance of properties.

Binary compositions of an ethylene-containing thermoplastic resin plus appreciable quantities of a process oil—say, in a 3:1 ratio by weight—will, when warm, be fluid and adhere well to plastics, textile webs, etc. However, when filler is added as a third component, the dry filler will make the filled resin charge progressively less fluid—less tacky—and thus adhere less well to substrate. For blends where filler levels are high—say, 70% and over—poor adhesion to substrates may pose a problem to a manufacturer of composite sound-deadening carpeting. We explored the effect of the use of tackifiers on the improved elongation properties that surfactants impart to the highly filled, oil-containing EVA blends. Data for these tests are provided by Comparative Example 28 and Example 78.

Blends with 76% filler, and no tackifier, show little or no tack—even a rating of 1 on the tack scale is seldom obtained. Also, as shown in C-28, the physical properties of tackifier-containing blends are poor, as evidenced by the very low (10%) elongation value for C-28. The tack rating for C-28 is also poor, at only 1.5 units. To make the blend of Ex. 78, with a high (4.0) tack rating, the amount of tackifier was raised to the 5% level, at the expense of the EVA resin (15% in C-28, reduced to 12% in Ex. 78). This change should make the blend more tacky—which it did—and should totally destroy elongation, etc. properties, as the tackifier per se has very poor tensile and elongation resistance. To compensate, only 0.5% of surfactant No. 8 was added to the system, with startingly good results:
 a. The tack rating is good, at 4.0.
 b. The MI has been increased
 c. The elongation, instead of vanishing, has been increased over 60-fold, and
 d. The blend is now soft and flexible, rather than stiff.

The blends of C-29, Ex. 79 and Ex. 80, show the same effects as noted above, when a different EVA resin with no inherent tack tendency is employed, and tackifier No. 2 is substituted for tackifier No. 1. Additive No. 8 plus the tackifier have
 a. markedly improved the tack rating, b. decreased the MI,
c. sharply enhanced the elongation, and
d. make a very stiff blend soft and flexible.

In summary, the use of surfactants in ethylene copolymer based blends provides an outstanding means to enhance the elongation of blends which contain very high levels of inert fillers. The method is effective for a wide variety of ethylene copolymers; for fillers of widely varying specific gravities, particle sizes, and chemical compositions. The method is effective for common types of process oils—and for systems where the process oil contains a polymeric-type plasticizer ingredient. It also is effective for compounds where ethylene-type polymers are used as polymer alloys—for systems based on ethylene homopolymer—and where the polymer system also contains synthetic rubber.

It is manifestly impossible to illustrte all variants of so complex a system. A skilled compounder can effect many other variants, without departure from the teachings of this invention. All required final properties should be tested to confirm the suitability of a given combination of ingredients for the intended purpose.

atoms, the ethylene content of said copolymer being from about 40 to about 95% by weight, the comonomer content of said copolymer being from about 5 to about 60% by weight, and the melt index of said copolymer being from about 0.1 to about 400, provided that when said copolymer of ethylene is an ethylene/vinyl ester or ethylene/unsaturated mono- or dicarboxylic acid ester copolymer said copolymer can contain up to about 15 percent by weight of carbon monoxide or sulfur dioxide; provided, that when the olefin polymer of paragraph (e) is absent, the amount of ethylene copolymer is at least about 5% by weight;

(b) from 0 to about 20 percent by weight of at least one plasticizer selected from the group consisting of processing oils, epoxidized oils, polyesters, polyethers, and polyether esters;

(c) from about 40 to about 90% by weight of filler;

(d) from about 0.05 to about 5% by weight of at least one surface active agent selected from the group consisting of alkanol amides; betaine derivatives; block copolymers comprising a series of condensates of ethylene oxide with hydrophobic bases

TABLE 9

EFFECTS OF INCLUSION OF SPECIAL INGREDIENTS IN BLENDS OF EVA - PROCESS OIL - CaCO$_3$ - SURFACE ACTIVE AGENT

| EXAMPLE NO | C-1 | C-26 | 76 | C-27 | 77 | C-28 | 78 | C-29 | 79 | 80 |
|---|---|---|---|---|---|---|---|---|---|---|
| EVA No. 1 | 16.2 | 14.2 | 14.2 | — | — | — | — | — | — | — |
| EVA No. 2 | 4.0 | 4.0 | 4.0 | — | — | — | — | — | — | — |
| EVA No. 5[1] | — | 2.0 | 2.0 | — | — | — | — | — | — | — |
| EVA No. 6[2] | — | — | — | 17.5 | 17.5 | 15.0 | 12.0 | — | — | — |
| EVA No. 7[3] | — | — | — | — | — | — | — | 18.5 | 18.5 | 14.5 |
| PROCESS OIL - "CIRCOSOL" 4240 | 7.3 | 7.3 | 7.3 | 5.3 | 5.3 | 7.0 | 7.0 | 6.5 | 6.5 | 5.5 |
| Plasticizer - "Santicizer" 429[4] | — | — | — | 1.2 | 1.2 | — | — | — | — | — |
| Filler - No. 9 Whiting | 72.5 | 72.5 | 72.5 | 76.0 | 76.0 | 76.0 | 76.0 | 75.0 | 75.0 | 75.0 |
| Tackifier No. 1[5] | — | — | — | — | — | 2.0 | 5.0 | — | — | — |
| Tackifier No. 2[6] | — | — | — | — | — | — | — | — | — | 5.0 |
| Additive No. 8 | — | — | 1.0 | — | 0.5 | — | 0.5 | — | 1.0 | 1.0 |
| Physical Properties | | | | | | | | | | |
| Tack Rating[7] | — | — | — | 0 | 0 | 1.5 | 4.0 | — | 1.0 | 2.7 |
| MI | 2.2 | 4.7 | 8.8 | 0.8 | 1.5 | 2.6 | 17.6 | — | 2.1 | 11.0 |
| SP. GR. | 1.82 | 1.81 | 1.80 | 1.88 | 1.92 | — | 1.93 | 1.87 | 1.87 | 1.86 |
| Tensile Strength | | | | | | | | | | |
| PSI | 650 | 300 | 320 | 350 | 360 | 760 | 220 | 1080 | 360 | 230 |
| kPa | 4480 | 2070 | 2210 | 2410 | 2480 | 5240 | 1520 | 7450 | 2480 | 1590 |
| Elongation, % | 25 | 147 | 590 | 470 | 550 | 10 | 630 | 18 | 450 | 450 |
| Thickness of Strip, | | | | | | | | | | |
| mils | 62 | 59 | 58 | — | 55 | — | 53 | 59 | 56 | 56 |
| mm | 1.57 | 1.50 | 1.47 | — | 1.40 | — | 1.35 | 1.50 | 1.42 | 1.42 |
| Stiffness of strip, g | 75 | 58 | 25 | 80 | 44 | 93 | 16 | 160 | 35 | 32 |

Footnotes for Table 9
[1]EVA #5 = "Elvax" 40 resin, E. I. du Pont de Nemours and Company, Inc., 40.5% VAc; 59.5% E; 57 M.I.
[2]EVA #6 = "Elvax" 470 resin, E. I. du Pont de Nemours and Company, Inc., 18% VAc; 82% E; 0.7 M.I.
[3]EVA #7 = "Elvax" 670 resin, E. I. du Pont de Nemours and Company, Inc., 12% VAc; 88% E; 0.3 M.I.
[4]"Santicizer" 429 - medium molecular weight polyester type plasticizer from Monsanto; Sp. Gr. 1.1, freezing point −60° C., acid number 22 mg KOH/g, viscosity @ 25° C,. is 50 stokes.
[5]Tackifier No. 1 = "Piccovar" L-60 (Hercules, Inc.) low softening point, aromatic type resin.
[6]Tackifier No. 2 = "Piccopale" 100 (Hercules, Inc.) aliphatic low molecular weight hydrocarbon resin.
[7]The tack ratings were the average of values obtained by several observers, who used a common subjective standard from zero to 4:
0 = Not tacky to touch. Sample plaque will slide easily along a smooth surface.
1 = Perceptible tack to finger. Plaque no longer slides easily.
2 = Moderate tack to finger. Plaque slides with difficulty.
3 = Sticky to touch. Samples will nearly adhere to observer's fingers.
4 = Strongly sticky. Samples will stick in inverted position for 5-10 seconds or longer.

I claim:

1. A composition comprising (a) from 0 to about 50% by weight of at least one copolymer of ethylene with at least one comonomer selected from the group consisting of vinyl esters of saturated carboxylic acids wherein the acid moiety has up to 4 carbon atoms, unsaturated mono- and dicarboxylic acids of 3 to 5 carbon atoms, salts of said unsaturated acids, and esters of said unsaturated acids wherein the alcohol moiety has 1 to 8 carbon formed by condensing propylene oxide with propylene glycol; ethoxylated compounds comprising alcohols, alkyl phenols, amines and amides; sulfonated derivatives comprising alkyl sulfonates, aryl sulfonates, alkyl-aryl sulfonates, amine and amide sulfonates, olefin sulfonates, sulfosuccinates, sulfonated fatty acid esters, sulfonates of ethoxylated alkyl phenols and of oils and of fatty acids, naphtholene and alkyl naphtholene sulfonates, condensed naphtholene sulfonates, naphthalene and alkyl naphthalene sulfonates and petroleum sulfonates, and dodecyl and tridecyl benzene sulfonates; dodecyl and tridecyl sulfonic acids; sulfates of alcohols, of ethoxylated alcohols, of ethoxylated alkyl phenols, of oils, of fatty acids, of fatty esters, alkaryl sulfates, and sodium, ammonium and amine salts thereof; phosphate derivatives comprising phosphate esters, phosphate alcohol ethoxylates, phosphate ether ethoxylates, phosphate alkyl acids and phosphate alkyl quaternaries; and quaternary surfactants;

(e) from 0 to about 55% by weight of olefin polymer selected from the group consisting of low density branched polyethylene, high density linear polyethylene, linear copolymers of ethylene and another olefin comonomer, polypropylene and copolymers of propylene and ethylene where the ethylene content is up to 20% by weight provided, that when the ethylene copolymer of paragraph (a) is absent the amount of olefin polymer is at least about 5% by weight;

(f) from 0 to about 50% by weight of elastomeric polymer; and (g) from 0 to about 30% by weight of tackifier.

2. The composition of claim 1 wherein said surface active agent is selected from the group consisting of alkanol amides; betaine derivatives; block copolymers consisting essentially of a series of condensates of ethylene oxide with hydrophobic bases formed by condensing propylene oxide with propylene glycol; ethoxylated compounds consisting essentially of ethoxylated alcohols, alkyl phenols, amines and amides; sulfonated derivatives consisting essentially of alkyl sulfonates, alkyl-aryl sulfonates, amine and amide sulfonates, sulfonated fatty acid esters, sulfonates of ethoxylated alkyl phenols and of oils and of fatty acids, naphtholene and alkyl naphtholene sulfonates, and condensed naphtholene sulfonates and dodecyl and tridecyl benzene sulfonates; sulfates of alcohols, of ethoxylated alcohols, of fatty acids, alkaryl sulfates, and sodium, ammonium and amine salts thereof; phosphate derivatives consisting essentially of phosphate esters, phosphate alcohol ethoxylates, phosphate ether ethoxylates, phosphate alkyl acids and phosphate alkyl quaternaries; and quaternary surfactants.

3. The composition of claim 2 wherein said copolymer of ethylene is present in an amount of from about 5 percent to about 50 percent by weight and is a mixture of at least two copolymers of ethylene, copolymer (A) and copolymer (B), each copolymer having at least one polar comonomer selected from the group consisting of vinyl esters of saturated carboxylic acids wherein the acid moiety has up to 4 carbon atoms, unsaturated mono- or dicarboxylic acids of 3 to 5 carbon atoms, the salts of said unsaturated acids, and esters of said unsaturated acids wherein the alcohol moiety has 1 to 8 carbon atoms, copolymer (A) having a polar comonomer content of from about 2 to about 30 percent by weight, an ethylene content of from about 70 to about 98 percent by weight and a melt index of from about 0.1 to about 20, and copolymer (B) having a polar comonomer content of from about 28 to about 60 percent by weight, an ethylene content of from about 40 to about 72 percent by weight and a melt index of from about 5 to about 1000, provided that the polar comonomer content of copolymer (B) is at least 12 percent by weight higher than the polar comonomer content of copolymer (A) and the weight ratio of copolymer (A) to copolymer (B) is from about 99/1 to about 55/45.

4. The composition of claim 3, wherein (a) said mixture of at least two copolymers of ethylene is present in an amount of from about 8 to 35 percent by weight, copolymer (A) having a polar comonomer content of from about 5 to about 28 percent by weight, an ethylene content of from about 72 to about 95 percent by weight and a melt index of from about 0.3 to about 10, and copolymer (B) having a polar comonomer content of from about 30 to about 60 percent by weight, an ethylene content of from about 40 to about 70 percent by weight and a melt index of from about 10 to about 200, provided that the polar comonomer content of copolymer (B) is at least 15 percent by weight higher than the polar comonomer content of copolymer (A); (b) said plasticizer is present in an amount of from about 2 to about 15 percent by weight wherein from 0 to about 50% by weight of said plasticizer is a plasticizer other than processing oil; (c) said filler is present in an amount of from about 55 to about 90 percent by weight, (d) said surface active agent is present in an amount of from about 0.1 to about 2.5% by weight; (f) said elastomeric polymer is present in an amount of from 0 to about 25% by weight; and (g) said tackifier is present in an amount of from 0 to about 20% by weight.

5. A composition of claim 4, wherein the ratio of copolymer (A) to copolymer (B) is from about 97/3 to about 60/40.

6. The composition of claim 2 wherein (a) said copolymer of ethylene is present in an amount of from about 8 to about 35 percent by weight, the ethylene content of said copolymer being from about 45 to about 91% by weight, the comonomer content of said copolymer being from about 9 to about 55 percent by weight and the melt index of said copolymer being from about 0.1 to about 50;

(b) said plasticizer is present in an amount of from about 2 to about 15 percent by weight wherein from 0 to about 50% by weight of said plasticizer is a plasticizer other than processing oil;

(c) said filler is present in an amount of from about 55 to about 90 percent by weight; (d) said surface active agent is present in an amount of from about 0.1 to about 2.5% by weight; and (g) said tackifier is present in an amount of from 0 to about 20% by weight.

7. The composition of claim 6 wherein said filler is selected from the group consisting of calcium carbonate, barium sulfate, hydrated alumina, clay, magnesium carbonate, calcium sulfate, silica, iron, lead, or oxides thereof, mica, talc and wollastonite, flyash, cement dust, yarns, wood flour, nut shells, ground rice hulls and mixtures thereof.

8. The composition of claim 7 wherein said filler is selected from the group consisting of calcium carbonate, barium sulfate, hydrated alumina, and mixtures thereof.

9. The composition of claim 8 containing up to about 15% by weight of a polymer selected from the group consisting of ethylene/carbon monoxide, and ethylene/sulfur dioxide.

10. The composition of claim 8 wherein said surface active agent is selected from the group consisting of sulfonated derivatives consisting essentially of alkyl sulfonates, alkyl-aryl sulfonates, amine and amide sulfonates, sulfonated fatty acid esters, sulfonates of ethoxylated alkyl phenyls and of oils and of fatty acids, naphtholene and alkyl naphtholene sulfonates, and condensed naphtholene sulfonates; sulfates of alcohols, of ethoxylated alcohols, of fatty acids, alkaryl sulfates, and sodium, ammonium and amine salts thereof; and phosphate esters.

11. The composition of claim 10 wherein said copolymer of ethylene is selected from the group consisting of ethylene/vinyl acetate, ethylene/acrylic acid and its ionomers, ethylene/methacrylic acid and its ionomers, ethylene/methyl acrylate, ethylene/ethyl acrylate, ethylene/isobutyl acrylate, ethylene/normal butyl acrylate, ethylene/isobutyl acrylate/methacrylic acid and its ionomers, ethylene/normal butyl acrylate/methacrylic acid and its ionomers, ethylene/isobutyl acrylate/acrylic acid and its ionomers, ethylene/normal butyl acrylate/acrylic acid and its ionomers, ethylene/methyl methacrylate, ethylene/vinyl acetate/methacrylic acid and its ionomers, ethylene/vinyl acetate/acrylic acid and its ionomers, ethylene/vinyl acetate/carbon monoxide, ethylene/methyl acrylate/carbon monoxide, ethylene/normal butyl acrylate/carbon monoxide, ethylene/isobutyl acrylate/carbon monoxide, ethylene/vinyl acetate/monoethyl meleate and ethylene/methyl acrylate/monoethyl maleate.

12. The composition of claim 11 wherein said copolymer of ethylene is selected from the group consisting of ethylene/vinyl acetate, ethylene/ethyl acrylate, ethylene/methyl acrylate, ethylene/isobutyl acrylate, ethylene/methyl methacrylate, and ethylene/vinyl acetate/methacrylic acid.

13. The composition of claim 12, wherein (a) said copolymer of ethylene is present in an amount of from about 12 to about 25 percent by weight; the ethylene content of said copolymer being from about 72 to about 88 percent by weight, the comonomer content of said copolymer being from about 12 to about 28 percent by weight, and the melt index of said copolymer being from about 1 to about 10;
(b) said plasticizer is present in an amount of from about 4 to about 10 percent by weight when the filler is selected from the group consisting of calcium carbonate and hydrated alumina and from about 3 to about 10 percent by weight when the filler is barium sulfate, wherein from 0 to about 20% by weight of said plasticizer is a plasticizer other than processing oil;
(c) said filler is present in an amount of from about 65 to about 85 percent by weight when the filler is selected from the group consisting of calcium carbonate and hydrated alumina and from about 70 to about 90 percent by weight when the filler is barium sulfate; (d) said surface active agent is present in an amount of from about 0.12 to about 0.75% by weight; (f) said elastomeric polymer is present in an amount of from 0 to about 12% by weight; and (g) said tackifier is present in an amount of from 0 to about 15% by weight.

14. The composition of claim 13 wherein said copolymer of ethylene is present in an amount of from about 12 to about 25% by weight, and is a mixture of at least two copolymers of ethylene, copolymer (A) and copolymer (B), each copolymer having at least one polar comonomer selected from the group consisting of vinyl esters of saturated carboxylic acids wherein the acid moiety has up to 4 carbon atoms, unsaturated mono- or dicarboxylic acids of 3 to 5 carbon atoms, the salts of said unsaturated acids, and esters of said unsaturated acids wherein the alcohol moiety has 1 to 8 carbon atoms, copolymer (A) having a polar comonomer content of from about 10 to about 25 percent by weight, an ethylene content of from about 75 to about 90 percent by weight and a melt index of from about 0.5 to about 2 and wherein copolymer (B) has a polar comonomer content of from about 33 to about 60 percent by weight, an ethylene content of from about 40 to about 67 percent by weight and a melt index of from about 15 to about 100, and wherein the ratio of copolymer (A) to copolymer (B) is from about 95/5 to about 65/35, provided that the polar comonomer content of copolymer (B) is at least 18 percent by weight higher than the polar comonomer content of copolymer A.

15. The composition of claims 1, 2, 10, 13 or 14, in the form of a sound-deadening sheet.

16. A carpet having a backside coating consisting essentially of the composition of claims 1, 2, 10, 13 or 14.

17. An automotive carpet having a backside coating consisting essentially of the composition of claims 1, 2, 10, 13 or 14.

18. A foam, fabric, or scrim having a backside coating consisting essentially of the composition of claims 1, 2, 10, 13 or 14.

* * * * *